US008792053B2

(12) United States Patent
Fujishiro et al.

(10) Patent No.: US 8,792,053 B2
(45) Date of Patent: Jul. 29, 2014

(54) IMAGE PROCESSING APPARATUS, IMAGE PROCESSING METHOD, AND PROGRAM

(71) Applicant: Sony Corporation, Tokyo (JP)

(72) Inventors: Shigeo Fujishiro, Tokyo (JP); Yoshito Suzuki, Tokyo (JP); Eiji Ozeki, Tokyo (JP); Kazuhiro Takahashi, Kanagawa (JP); Takayoshi Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/101,443

(22) Filed: Dec. 10, 2013

(65) Prior Publication Data

US 2014/0176794 A1 Jun. 26, 2014

(30) Foreign Application Priority Data

Dec. 20, 2012 (JP) ................................ 2012-277561

(51) Int. Cl.
*H04N 7/01* (2006.01)
*H04N 11/20* (2006.01)

(52) U.S. Cl.
USPC ............... 348/441; 348/402.1; 348/413.1; 348/416.1; 348/439.1; 348/446; 348/451; 348/452; 348/457; 348/538; 348/620; 348/699; 348/700; 348/793; 348/189; 348/302; 348/305; 348/349; 348/354; 348/398.1; 348/222.1; 348/288; 382/254; 382/260; 382/276; 382/295; 382/300

(58) Field of Classification Search
USPC ............ 348/441, 402.1, 413.1, 416.1, 439.1, 348/446, 451, 452, 457, 620, 699, 700, 793, 348/302, 305, 349, 354, 398.1, 222.1, 288, 348/189; 345/538; 382/254, 260, 276, 295, 382/300
See application file for complete search history.

(56) References Cited

U.S. PATENT DOCUMENTS

| 4,775,886 | A | * | 10/1988 | Hirosawa | 358/528 |
| 7,031,535 | B2 | * | 4/2006 | Yamamoto | 382/240 |
| 8,130,293 | B2 | * | 3/2012 | Kanamori et al. | 348/280 |
| 8,150,197 | B2 | * | 4/2012 | Hwang et al. | 382/263 |
| 8,294,812 | B2 | * | 10/2012 | Okada et al. | 348/362 |
| 8,472,745 | B2 | * | 6/2013 | Kameyama | 382/260 |
| 2006/0132629 | A1 | * | 6/2006 | Tsuruoka | 348/280 |
| 2009/0109310 | A1 | * | 4/2009 | Kobayashi et al. | 348/302 |
| 2009/0278954 | A1 | * | 11/2009 | Kanamori et al. | 348/222.1 |

(Continued)

FOREIGN PATENT DOCUMENTS

JP 2009-296284 12/2009

*Primary Examiner* — Jefferey Harold
*Assistant Examiner* — Mustafizur Rahman
(74) *Attorney, Agent, or Firm* — Dentons US LLP

(57) ABSTRACT

An image processing apparatus includes: a normal interpolated image generation unit to generate an image that is interpolated between a plurality of original images reproduced along time series, the image being a normal interpolated image, based on each of the plurality of original images; a high-frequency area extraction unit to extract a high-frequency area having a spatial frequency higher than a predetermined value in each of the plurality of original images; a high-frequency area interpolated image generation unit to generate an image that is interpolated between the plurality of original images, the image being a high-frequency area interpolated image, based on a change in position of the high-frequency area along with an elapse of time on the time series and on each of the plurality of original images; and a combination unit to execute combining processing to combine the normal interpolated image and the high-frequency area interpolated image.

12 Claims, 23 Drawing Sheets

(56) References Cited

U.S. PATENT DOCUMENTS

| | | | |
|---|---|---|---|
| 2010/0020210 A1* | 1/2010 | Tsunekawa et al. | 348/294 |
| 2010/0033602 A1* | 2/2010 | Okada et al. | 348/241 |
| 2010/0182459 A1* | 7/2010 | Hwang et al. | 348/240.99 |
| 2011/0063473 A1* | 3/2011 | Tsunekawa et al. | 348/222.1 |
| 2011/0157454 A1* | 6/2011 | Matsuoka | 348/340 |
| 2011/0158541 A1* | 6/2011 | Watanabe | 382/195 |
| 2011/0193937 A1* | 8/2011 | Watanabe et al. | 348/43 |
| 2011/0200270 A1* | 8/2011 | Kameyama | 382/260 |

\* cited by examiner

| | Local motion vector $mv_L$ | |
|---|---|---|
| | Forward motion vector $V_{n,L}$ | Backward motion vector $V_{n-1,L}$ |
| | ⋮ | ⋮ |
| Block B10 | (−4, 0) | (4, 0) |
| Block B11 | (0, 8) | (0, −8) |
| | ⋮ | ⋮ |

FIG.5

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2012-277561 filed Dec. 20, 2012, the entire contents of which are incorporated herein by reference.

BACKGROUND

The present disclosure relates to an image processing apparatus, an image processing method, and a program causing a computer to execute the image processing method. Specifically, the present disclosure relates to an image processing apparatus and an image processing method with which the number of frames per unit time in a moving image is changed and to a program causing a computer to execute the image processing method.

In image processing apparatuses in related art such as television receivers, a frame rate conversion to change the number of frames per unit time, i.e., a frame rate, in a moving image is performed in some cases. For example, in order to smoothen the motion of an object in a moving image, a frame rate conversion to increase a frame rate, which is called an up-conversion, is performed.

In such an up-conversion, a frame interpolation method in which an interpolated frame is generated from original frames and inserted between the original frames is widely used. In the frame interpolation method, motion compensation processing to detect the motion of an object in the original frame and generate an interpolated frame based on the motion is performed. This allows a natural interpolation to be performed in a moving image including a moving object.

In performing the motion compensation processing, a method of detecting the motion of an object on a block-to-block basis or a pixel-to-pixel basis is widely used, but the method may cause a possibility that the motion detection fails in some blocks or pixels. If the object whose motion has failed to be detected is a high-frequency component, e.g., a character telop, a defect easily occurs in an image with a part at which the detection has failed. For example, since an object including a high-frequency component has a clear boundary with the background, blurs occur at the part at which the detection has failed. On the other hand, since an object including a low-frequency component has a blurred boundary, blurs are not liable to occur if the motion detection fails.

To suppress the defect involving the failure of the motion detection, the following image processing apparatus is provided. The image processing apparatus detects an area including a high-frequency component with motion to be an area for character telop and changes an interpolation method for such an area (see, for example, Japanese Patent Application Laid-open No. 2009-296284). The image processing apparatus detects motion of the entire area in the area of the character telop and detects motion on a block-to-block basis or a pixel-to-pixel basis in the other areas. Subsequently, along the direction of the detected motion, the entire area of the character telop in the original frame is displaced, and in areas other than the character telop, the original frame is displaced for each block or pixel, to generate an interpolated frame. The entire area of the character telop is displaced, so that no blurs occur in the area.

SUMMARY

In the above-mentioned technique in related art, however, the image quality of the moving image after the frame rate conversion may deteriorate. Specifically, the image processing apparatus performs different types of processing on the area of the character telop and on the other areas, and hence there is a possibility that the boundaries between those areas look unnatural.

This leads to a possibility that the image quality deteriorates.

The present disclosure has been made in view of the circumstances as described above, and it is desirable to improve the image quality of a moving image whose frame rate is converted.

According to an embodiment of the present disclosure, there are provided an image processing apparatus, an image processing method therefor, and a program causing a computer to execute the image processing method. The image processing apparatus includes a normal interpolated image generation unit, a high-frequency area extraction unit, a high-frequency area interpolated image generation unit, and a combination unit. The normal interpolated image generation unit is configured to generate an image that is interpolated between a plurality of original images reproduced along time series, the image being a normal interpolated image, based on each of the plurality of original images. The high-frequency area extraction unit is configured to extract a high-frequency area having a spatial frequency higher than a predetermined value in each of the plurality of original images. The high-frequency area interpolated image generation unit is configured to generate an image that is interpolated between the plurality of original images, the image being a high-frequency area interpolated image, based on a change in position of the high-frequency area along with an elapse of time on the time series and on each of the plurality of original images. The combination unit is configured to execute combining processing to combine the normal interpolated image and the high-frequency area interpolated image. This provides effects of generating the normal interpolated image based on each of the plurality of original images, generating the high-frequency area interpolated image based on the change in position of the high-frequency area along with an elapse of time on the time series and on each of the plurality of original images, and combining the normal interpolated image and the high-frequency area interpolated image.

Further, in the embodiment of the present disclosure, the image processing apparatus may further include a vector detection unit configured to detect a vector indicating a direction and a distance in which a position of the high-frequency area changes within a predetermined period of time on the time series, and the high-frequency area interpolated image generation unit may be configured to generate the high-frequency area interpolated image based on the vector and each of the plurality of original images. This provides an effect of generating the high-frequency area interpolated image based on the vector indicating the direction and the distance in which the position of the high-frequency area changes and on each of the plurality of original images.

Further, in the embodiment of the present disclosure, the image processing apparatus may further include a combination ratio determination unit configured to determine a ratio at which the normal interpolated image and the high-frequency area interpolated image are combined, for each pixel in accordance with each pixel value of pixels in the high-frequency area, and the combination unit may be configured to execute the combining processing according to the ratio. This provides an effect of executing the combining processing according to the ratio determined for each pixel in accordance with each pixel value of the pixels in the high-frequency area.

Further, in the embodiment of the present disclosure, the high-frequency area extraction unit may include a filter unit, a difference detection unit, and an increase unit. The filter unit is configured to extract the high-frequency area in each of the plurality of original images. The difference detection unit is configured to detect, for each pixel, a difference in pixel value between two adjacent original images of the plurality of original images. The increase unit is configured to increase each pixel value of the pixels in the high-frequency area in each of the two adjacent original images in accordance with the difference, and supply the increased pixel value to the vector detection unit and the combination ratio determination unit. This provides an effect of increasing each pixel value of the pixels in the high-frequency area in accordance with the difference.

Further, in the embodiment of the present disclosure, the high-frequency area extraction unit may include a first difference coring processing unit configured to execute first difference coring processing to remove a difference smaller than a first difference threshold from the detected differences, and the increase unit may be configured to increase each pixel value of the pixels in the high-frequency area in accordance with the difference on which the first difference coring processing is performed, and supply the increased pixel value to the vector detection unit. This provides an effect of increasing each pixel value of the pixels in the high-frequency area in accordance with the difference on which the first difference coring processing is performed.

Further, in the embodiment of the present disclosure, the high-frequency area extraction unit may include a second difference coring processing unit configured to execute second difference coring processing to remove a difference smaller than a second difference threshold from the detected differences, and the increase unit may be configured to increase each pixel value of the pixels in the high-frequency area in accordance with the difference on which the second difference coring processing is performed, and supply the increased pixel value to the combination ratio determination unit. This provides an effect of increasing each pixel value of the pixels in the high-frequency area in accordance with the difference on which the second difference coring processing is performed.

Further, in the embodiment of the present disclosure, the high-frequency area extraction unit may include a first pixel coring processing unit configured to execute first pixel coring processing to remove a pixel with a pixel value smaller than a first pixel value threshold in the extracted high-frequency area, and the increase unit may be configured to increase, in accordance with the difference, each pixel value of the pixels in the high-frequency area on which the first pixel coring processing is performed, and supply the increased pixel value to the vector detection unit. This provides an effect of increasing, in accordance with the difference, each pixel value of the pixels in the high-frequency area on which the first pixel coring processing is performed.

Further, in the embodiment of the present disclosure, the high-frequency area extraction unit may include a second pixel coring processing unit configured to execute second pixel coring processing to remove a pixel with a pixel value smaller than a second pixel value threshold in the extracted high-frequency area, and the increase unit may be configured to increase, in accordance with the difference, each pixel value of the pixels in the high-frequency area on which the second pixel coring processing is performed, and supply the increased pixel value to the combination ratio determination unit. This provides an effect of increasing, in accordance with the difference, each pixel value of the pixels in the high-frequency area on which the second pixel coring processing is performed.

Further, in the embodiment of the present disclosure, each of the plurality of original images may include a plurality of blocks each having a predetermined shape, and the normal interpolated image generation unit may be configured to generate the normal interpolated image based on a change in position of each of the plurality of blocks along with an elapse of time on the time series and on each of the plurality of original images. This provides an effect of generating a normal interpolated image based on the change in position of each of the plurality of blocks along with an elapse of time on the time series and on each of the plurality of original images.

Further, in the embodiment of the present disclosure, the image processing apparatus may further include a selection unit configured to select the combined image by the combination unit and the plurality of original images in order of the time series and output the selected image. This provides an effect of selecting the combined image and the plurality of original images in order of the time series and outputting the selected image.

According to the present disclosure, it is possible to produce an excellent effect of improving the image quality of a moving image whose frame rate is converted.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram showing an example of the local motion vector in the first embodiment;

DETAILED DESCRIPTION OF EMBODIMENTS

Hereinafter, modes for carrying out the present disclosure (hereinafter, referred to as embodiments) will be described. Description will be given in the following order.

1. First Embodiment (Example of Combining Normal Interpolated Image and High-Frequency Area Interpolated Image)

2. Second Embodiment (Example of Combining Normal Interpolated Image and High-Frequency Area Interpolated Image Generated from Difference Obtained After Coring Processing)

1. First Embodiment

Configuration Example of Information Processing System

Figure 1:
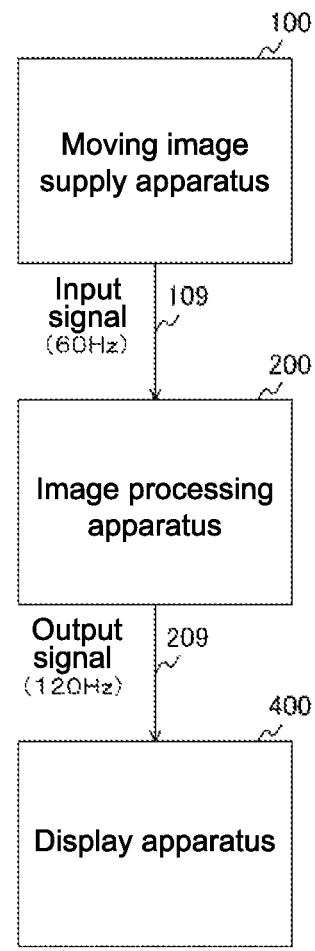
FIG. 1 is a block diagram showing a configuration example of an information processing system in a first embodiment.

FIG. 1 is a block diagram showing a configuration example of an information processing system in a first embodiment. The information processing system includes a moving image supply apparatus 100, an image processing apparatus 200, and a display apparatus 400.

The moving image supply apparatus 100 supplies an input signal, which contains a moving image, to the image processing apparatus 200 via a signal line 109. The moving image contains a plurality of frames (images) to be reproduced in a time-series order. Hereinafter, each of the images in the input signal is referred to as an "original image". For example, the moving image supply apparatus 100 receives a broadcast wave providing a moving image and acquires the moving image from the broadcast wave. When the frame rate of the moving image is represented by hertz (Hz), the frame rate of the moving image in the input signal is 60 hertz, for example.

Note that the moving image supply apparatus 100 may acquire a moving image from a source other than the broadcast wave. For example, the moving image supply apparatus 100 may acquire the moving image by reading out a moving image recorded on a recording medium such as a DVD (Digital Versatile Disk) or recorded in a storage device such as an HDD (Hard Disk Drive).

The image processing apparatus 200 converts the frame rate of the moving image in the input signal and outputs an output signal, which contains the moving image whose frame rate is converted, to the display apparatus 400 via a signal line 209. The frame rate of the moving image in the output signal is 120 hertz, for example.

In general, when a ratio of the frame rate of the input signal to the frame rate of the output signal is 1:m (m is a real number larger than 1) in a frame rate conversion, such a conversion is referred to as an mX speed frame rate conversion. For example, the conversion from 60 hertz to 120 hertz is a double-speed frame rate conversion. Note that the image processing apparatus 200 may perform a frame rate conversion such as a quadruple-speed frame rate conversion from 30 hertz to 120 hertz, in addition to the double-speed frame rate conversion.

The display apparatus 400 reproduces and displays the moving image contained in the output signal.

(Configuration Example of Image Processing Apparatus)

Figure 2:
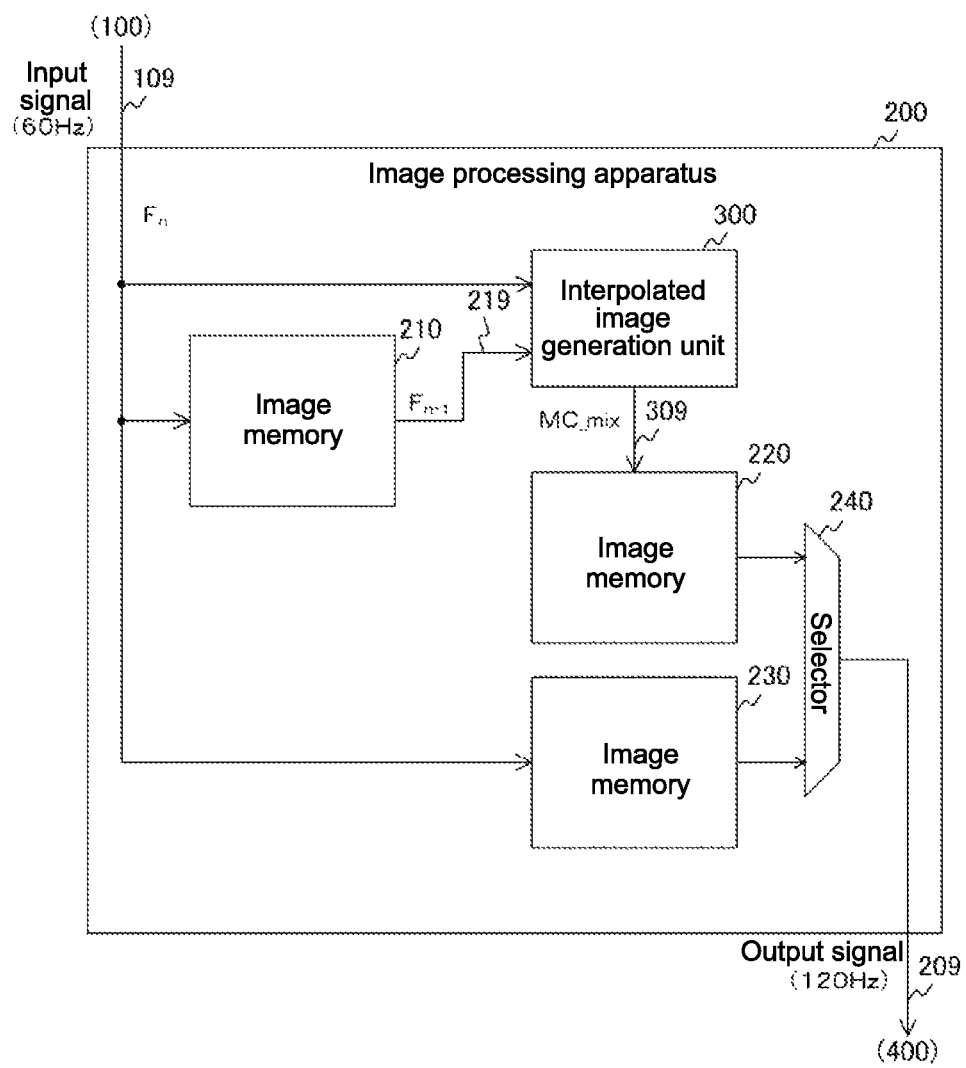
FIG. 2 is a block diagram showing a configuration example of an image processing apparatus in the first embodiment.

FIG. 2 is a block diagram showing a configuration example of the image processing apparatus 200 in the first embodiment. The image processing apparatus 200 includes image memories 210, 220, and 230, a selector 240, and an interpolated image generation unit 300.

The image memories 210 and 230 each store an original image $F_n$ contained in the input signal. Herein, n is an integer indicating the order in which original images are reproduced. The interpolated image generation unit 300 and the selector 240 read out the original images stored in the image memories 210 and 230, respectively, when the next original image is input, so that an original image delayed by one image can be acquired.

The interpolated image generation unit 300 generates, based on the original images $F_n$ and $F_{n-1}$, an image to be interpolated between those original images $F_n$ and $F_{n-1}$. The generated image is a combined interpolated image MC_mix. The interpolated image generation unit 300 acquires the original image $F_n$ from the input signal and acquires the delayed original image $F_{n-1}$ from the image memory 210, to generate a combined interpolated image MC_mix based on those original images and cause the image memory 220 to store the resultant image MC_mix. The image memory 220 is for storing the combined interpolated image MC_mix.

The selector 240 selects and outputs the combined interpolated image MC_mix stored in the image memory 220 and the original image stored in the image memory 230 in a time-series order.

(Configuration Example of Interpolated Image Generation Unit)

Figure 3:
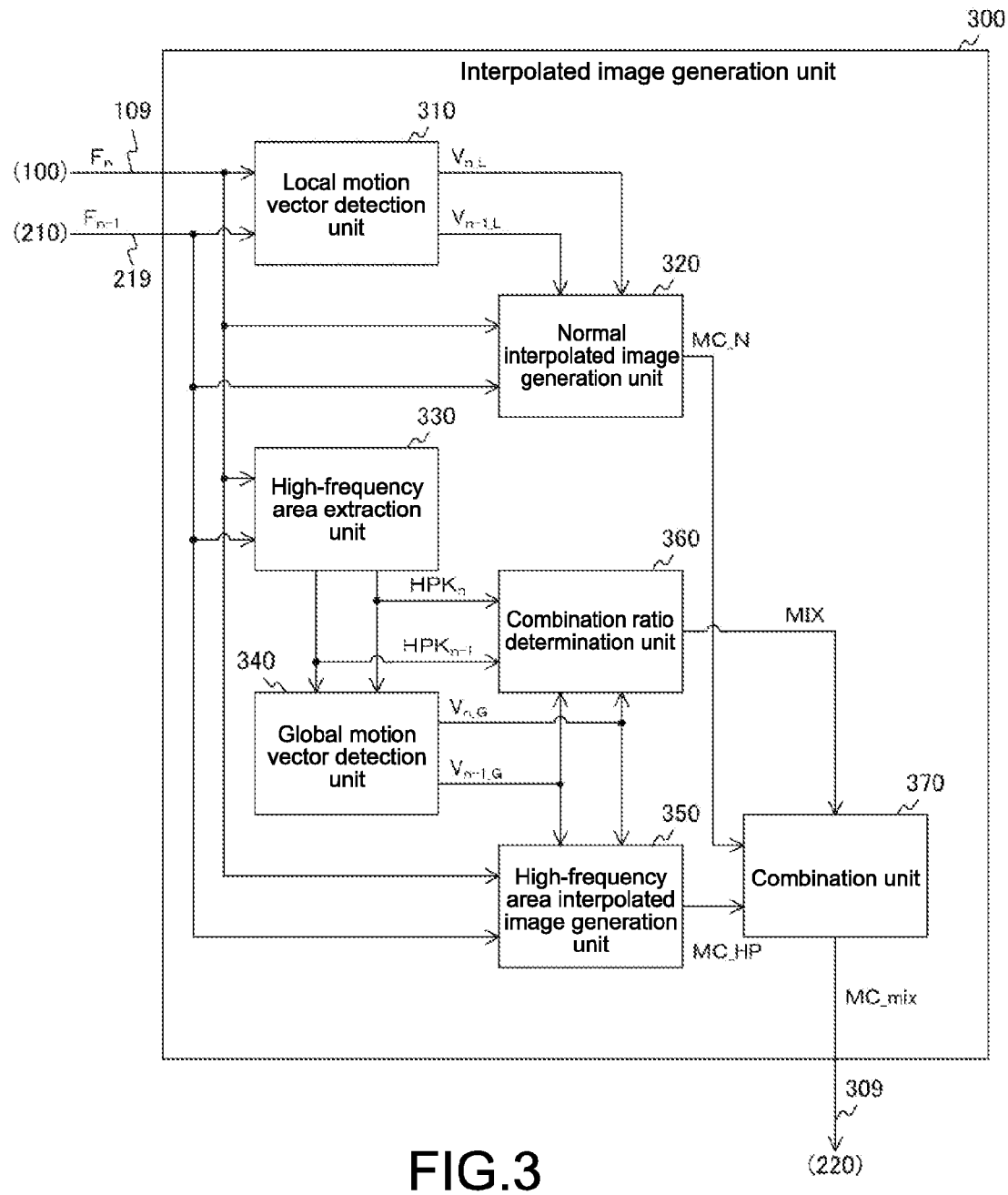
FIG. 3 is a block diagram showing a configuration example of an interpolated image generation unit in the first embodiment.

FIG. 3 is a block diagram showing a configuration example of the interpolated image generation unit 300 in the first embodiment. The interpolated image generation unit 300 includes a local motion vector detection unit 310, a normal interpolated image generation unit 320, a high-frequency area extraction unit 330, a global motion vector detection unit 340, a high-frequency area interpolated image generation unit 350, a combination ratio determination unit 360, and a combination unit 370.

The local motion vector detection unit 310 divides the original image into a plurality of blocks each having a predetermined shape and detects a vector, i.e., a local motion vector, which indicates a direction and a distance in which each of those blocks moves within a certain period of time. Specifically, the local motion vector detection unit 310 handles the original image as an image formed of square blocks each having 8×8 pixels, for example. The local motion vector detection unit 310 selects any one of the blocks of an interpolated image to use the block as a target block. The local motion vector detection unit 310 detects a block of the original image, which corresponds to the target block of the interpolated image, and then sets a search range W for an area in the original image, which falls within a certain range from the block of the original image. The search range W is a range used for searching for a local motion vector by block matching. For example, in the original image, the search range W is set for the target block and a predetermined number of blocks around the target block.

Here, a vector that is a candidate when a local motion vector is searched for is referred to as a candidate motion vector mv. The candidate motion vector my can be divided into $v_n$ and $v_{n-1}$ Expressions 1 and 2 below.

$$V_n = (v_{x\_n}, v_{y\_n}) = (-mvX \cdot (1-Relpos), -mvY \cdot (1-Relpos)) \quad \text{Expression 1}$$

$$V_{n-1} = (v_{x\_n-1}, v_{y\_n-1}) = (mvX \cdot Relpos, mvY \cdot RelPos) \quad \text{Expression 2}$$

In Expressions 1 and 2, mvX represents an x component of the candidate motion vector mv, and mvY represents a y component of the candidate motion vector mv. Further, in Expressions 1 and 2, Relpos represents an interpolation position parameter that indicates an interpolation position. Here, the interpolation position is a reproduction position of each combined interpolated image MC_mix in the output signal on a time axis on which the moving image is reproduced. The interpolation position parameter or Relpos is a value obtained by dividing a time between the original image and the interpolated image by a time between two adjacent original images, for example. In the double-speed frame rate conversion, the time between the original image and the interpolated image is a half of the time between the two adjacent original images, and the interpolation position parameter of Relpos is "0.50". Additionally, in the quadruple-speed frame rate conversion, three interpolated images are inserted between two adjacent original images, and the time between one of the original images and each interpolated image is ¼, ½, or ¾ of the time between the two original images. Consequently, the interpolation position parameter of Relpos of each of the interpolated images is "0.25", "0.50", or "0.75".

When the candidate motion vector my passes through a pixel at coordinates (x, y) in the target block, a pixel value "succ" of a pixel corresponding to an end point of the candidate motion vector my in the original image $F_n$ is expressed by Expression 3 below. Further, a pixel value "prev" of a pixel corresponding to a start point of the candidate motion vector my in the original image $F_{n-1}$ is expressed by Expression 4 below.

$$succ = F_n(x + v_{x\_n}, y + v_{y\_n-1}) \quad \text{Expression 3}$$

$$prev = F_{n-1}(x + v_{x\_n-1}, y + v_{y\_n-1}) \quad \text{Expression 4}$$

In Expression 3, $F_n(x, y)$ represents a pixel value of the pixel at coordinates (x, y) in the original image $F_n$. In Expression 4, $F_{n-1}(x, y)$ represents a pixel value of the pixel at coordinates (x, y) in the original image $F_{n-1}$.

Within the search range W, statistics of differences between the pixel values "prev" and the pixel values "succ" are obtained by Expressions 3 and 4, to obtain two blocks having the highest correlation within the search range W. The local motion vector detection unit 310 detects a candidate motion vector extending from one of the two blocks having the highest correlation to the other block and sets the detected vector as a local motion vector. Specifically, the local motion vector detection unit 310 detects a candidate motion vector my that satisfies Expressions 5 and 6 and sets the detected candidate motion vector my as a local motion vector $mv_L$.

$$E_{SAD}(mv) = \sum_{x \in B} \sum_{y \in B} |prev - succ| \quad \text{Expression 5}$$

$$mv = \arg\min_{mv \in W} E_{SAD}(mv) \quad \text{Expression 6}$$

In Expression 5, x and y represent coordinates of a pixel in the target block. $E_{SAD}$ represents the sum of absolute difference values of values of corresponding pixels of the two blocks and is used as an evaluation value indicating the level of the correlation between those blocks. Further, B represents the target block. In Expression 6, $minE_{SAD}$ represents a minimum value of $E_{SAD}$. $argminE_{SAD}(mv)$ represents a function that returns my obtained when $E_{SAD}$ takes a minimum value, that is, when the correlation is highest.

As exemplified in Expressions 5 and 6, the processing of evaluating the level of the correlation based on the sum of absolute difference values of pixel values is referred to as SAD (Sum of Absolute Difference estimation). Note that the local motion vector detection unit 310 can also obtain the level of the correlation by processing other than the SAD. For example, the local motion vector detection unit 310 may use MPC (Maximum matching Pixel Count). In the MPC, the number of pixels at which an absolute difference value of pixel values is equal to or smaller than a predetermined matching threshold is counted to evaluate the correlation level based on the count value. In the MPC, a candidate motion vector obtained when the count value is maximum is detected as the local motion vector.

The local motion vector detection unit 310 obtains the local motion vector $mv_L$ for each of all the blocks of the interpolated image and obtains a forward motion vector $v_{n\_L}$ and a backward motion vector $v_{n-1\_L}$ by using Expressions 7 and 8.

$$V_{n\_L} = (v_{x\_n\_L}, v_{y\_n\_L}) = (-mvX_L \cdot (1-Relpos), -mvY_L \cdot (1-Relpos)) \quad \text{Expression 7}$$

$$V_{n-1\_L} = (v_{x\_n-1\_L}, v_{y\_n-1\_L}) = (mvX_L \cdot Relpos, mvY_L \cdot RelPos) \quad \text{Expression 8}$$

In Expressions 7 and 8, $mvX_L$ is an x component of the local motion vector $mv_L$ and $mvY_L$ is a y component of the local motion vector $mv_L$.

The local motion vector detection unit 310 supplies the forward motion vector $v_{n\_L}$ and the backward motion vector $v_{n-1\_L}$ of each block to the normal interpolated image generation unit 320.

The normal interpolated image generation unit 320 generates an image to be interpolated between the original images $F_n$ and $F_{n-1}$, which is a normal interpolated image, based on the local motion vector $mv_L$ and the original images $F_n$ and $F_{n-1}$. The normal interpolated image generation unit 320 receives the forward motion vector $v_{n\_L}$ and the backward motion vector $v_{n-1\_L}$ from the local motion vector detection unit 310. The normal interpolated image generation unit 320 substitutes the received vectors into Expressions 9 and 10 below to obtain the pixel values "succ" and "prev" in the original images $F_n$ and $F_{n-1}$.

$$succ = F_n(x + v_{x\_n\_L}, y + v_{y\_n\_L}) \quad \text{Expression 9}$$

$$prev = F_{n-1}(x + v_{x\_n-1\_L}, y + v_{y\_n-1\_L}) \quad \text{Expression 10}$$

The normal interpolated image generation unit 320 substitutes the pixel values acquired by Expressions 9 and 10 into Expression 11 below to calculate a pixel value "out".

$$out = prev \cdot (1 - Relpos) + succ \cdot Relpos \qquad \text{Expression 11}$$

The normal interpolated image generation unit 320 supplies an image formed of the pixel values "out", which is a normal interpolated image MC_N, to the combination unit 370.

The high-frequency area extraction unit 330 extracts an area having a spatial frequency higher than a predetermined value from each of the original images $F_n$ and $F_{n-1}$, and sets the extracted areas as high-frequency areas $HP_n$ and $HP_{n-1}$. Further, the high-frequency area extraction unit 330 detects a difference value k in pixel value between the original images $F_n$ and $F_{n-1}$ for each pixel. Subsequently, the high-frequency area extraction unit 330 amplifies each pixel value of the extracted high-frequency areas $HP_n$ and $HP_{n-1}$ in accordance with the difference value k, to generate high-frequency areas $HPK_n$ and $HPK_{n-1}$. The high-frequency area extraction unit 330 supplies those high-frequency areas $HPK_n$ and $HPK_{n-1}$ to the global motion vector detection unit 340 and the combination ratio determination unit 360.

The global motion vector detection unit 340 detects a vector, i.e., a global motion vector, which indicates a direction and a distance in which the high-frequency area moves within a certain period of time. The global motion vector detection unit 340 receives the high-frequency areas $HPK_n$ and $HPK_{n-1}$ from the high-frequency area extraction unit 330 and detects the vector indicating the moving direction of the whole of those areas, to set the detected vector as a global motion vector $mv_G$. Specifically, the global motion vector detection unit 340 sets the search range W for the whole of the high-frequency areas $HPK_n$ and $HPK_{n-1}$ and detects a candidate motion vector that satisfies Expressions 6 and 12 below as the global motion vector $mv_G$.

$$E_{SAD}(mv) = \sum_{x \in MC} \sum_{y \in MC} |prev - succ| \qquad \text{Expression 12}$$

In Expression 12, MC represents the entire interpolated image.

The global motion vector detection unit 340 substitutes the obtained global motion vector $mv_G$ into Expressions 13 and 14 below and obtains a forward motion vector $V_{n\_G}$ and a backward motion vector $V_{n-1\_G}$.

$$V_{n\_G} = (v_{x\_n\_G}, v_{y\_n\_G}) = (-mvX_G \cdot (1-Relpos), -mvY_G \cdot (1-Relpos)) \qquad \text{Expression 13}$$

$$V_{n-1\_G} = (v_{x\_n-1\_G}, v_{y\_n-1\_G}) = (mvX_G \cdot RelPos, mvY_G \cdot RelPos) \qquad \text{Expression 14}$$

In Expressions 13 and 14, $mvX_G$ represents an x component of the global motion vector $mv_G$ and $mvY_G$ represents a y component of the global motion vector $mv_G$.

The global motion vector detection unit 340 supplies the forward motion vector $V_{n\_G}$ and the backward motion vector $V_{n-1\_G}$ to the high-frequency area interpolated image generation unit 350 and the combination ratio determination unit 360. Note that the global motion vector detection unit 340 is an example of a vector detection unit in the section "What is claimed is".

The high-frequency area interpolated image generation unit 350 generates an image to be interpolated between the original images $F_n$ and $F_{n-1}$, which is a high-frequency area interpolated image, based on the global motion vector $mv_G$ and the original images $F_n$ and $F_{n-1}$. The high-frequency area interpolated image generation unit 350 receives the forward motion vector $v_{n\_G}$ and the backward motion vector $v_{n-1\_G}$ from the global motion vector detection unit 340. The high-frequency area interpolated image generation unit 350 substitutes the received vectors into Expressions 15 and 16 below to obtain the pixel values "succ" and "prev" in the original images $F_n$ and $F_{n-1}$.

$$succ = F_n(x + v_{x\_n\_G}, y + v_{y\_n\_G}) \qquad \text{Expression 15}$$

$$prev = F_{n-1}(x + v_{x\_n-1\_G}, y + v_{y\_n-1\_G}) \qquad \text{Expression 16}$$

The high-frequency area interpolated image generation unit 350 substitutes the pixel values acquired by Expressions 15 and 16 into Expression 11 to calculate a pixel value "out". The high-frequency area interpolated image generation unit 350 supplies an image formed of the pixel values "out", which is a high-frequency area interpolated image MC_HP, to the combination unit 370.

The combination ratio determination unit 360 determines a combination ratio of the normal interpolated image MC_N and the high-frequency area interpolated image MC_HP. The combination ratio determination unit 360 receives the high-frequency areas $HPK_n$ and $HPK_{n-1}$ from the high-frequency area extraction unit 330 and combines the high-frequency areas $HPK_n$ and $HPK_{n-1}$ to generate combination ratio data MIX. The combination ratio data MIX is image data that indicates the combination ratio of each pixel by pixel values. The combination ratio determination unit 360 supplies the combination ratio data MIX to the combination unit 370.

The combination unit 370 combines the normal interpolated image MC_N and the high-frequency area interpolated image MC_HP based on the combination ratio data MIX. The combination unit 370 causes the image memory 220 to store the combined image as the combined interpolated image MC_mix.

Figure 4A:
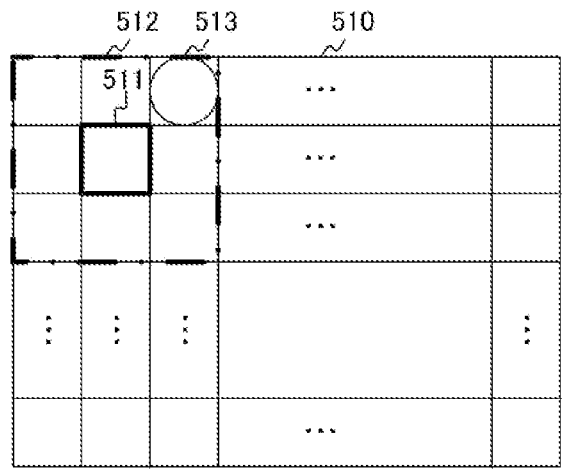
FIGS. 4A, 4B, and 4C are each a diagram for describing a method of detecting a local motion vector in the first embodiment.
Figure 4B:
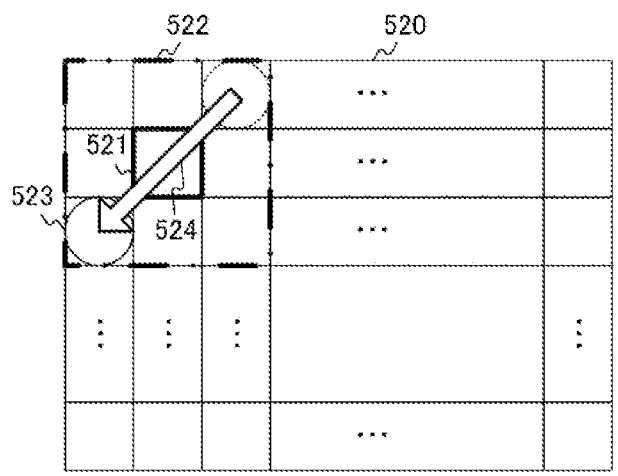
Figure 4C:
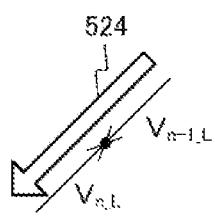

FIGS. 4A, 4B, and 4C are each a diagram for describing a method of detecting a local motion vector in the first embodiment. FIG. 4A is an example of an original image 510. FIG. 4B is an example of an original image 520 subsequent to the original image 510.

In the normal interpolated image, it is assumed that a block located at the same position as a block 511 in the original image 510 is selected as a target block. In this case, in the original image 510, the block 511 and a predetermined number of blocks around the block 511 (for example, 8 blocks) are set as a search range 512. Further, also in the original image 520, a block 521 corresponding to the block 511 and a predetermined number of blocks around the block 521 (for example, 8 blocks) are set as a search range 522. Subsequently, block matching between the blocks in the search range 512 and the blocks in the search range 522 is performed by using Expressions 5 and 6 and the like.

It is assumed that the following result is obtained in the block matching: a block 513 on the upper right of the search range 512 and a block 523 on the lower left of the search range 522 have the highest correlation. From this result, the vector indicating a direction and a distance from the block 513 to the block 523 is detected as a local motion vector 524.

FIG. 4C is a diagram showing an example of the forward motion vector and the backward motion vector. The local motion vector 524 is divided into the forward motion vector $V_{n\_L}$ and the backward motion vector $V_{n-1\_L}$ by Expressions 7 and 8.

FIG. 5 is a diagram showing an example of the local motion vector in the first embodiment. The local motion vector is obtained for each block, and each local motion vector is divided into the forward motion vector $V_{n\_L}$ and the backward motion vector $V_{n-1\_L}$. As a result, as exemplified in FIG. 5, the forward motion vector $V_{n\_L}$ and the backward motion vector $V_{n-1\_L}$ are obtained for each block. For example, when a local motion vector (8, 0) is detected in a block B10 in the normal interpolated image, this vector is divided into a forward motion vector (−4, 0) and a backward motion vector (4, 0) by Expressions 1 and 2.

(Configuration Example of Normal Interpolated Image Generation Unit)

Figure 6:
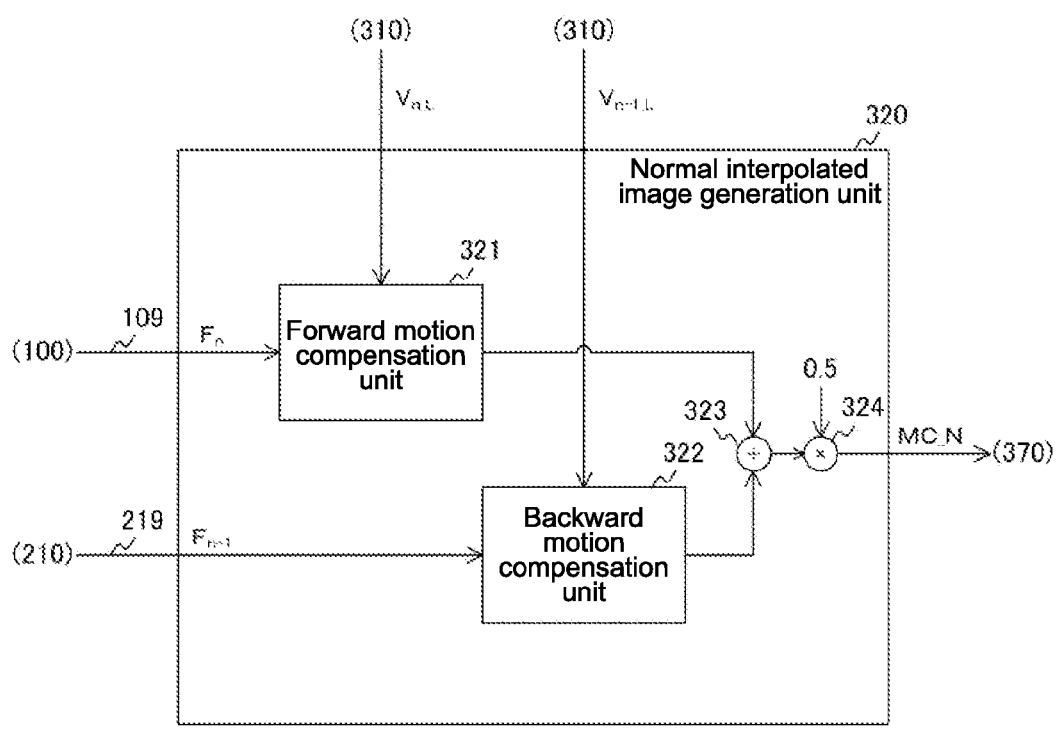
FIG. 6 is a block diagram showing a configuration example of a normal interpolated image generation unit in the first embodiment.

FIG. 6 is a block diagram showing a configuration example of the normal interpolated image generation unit 320 in the first embodiment. The normal interpolated image generation unit 320 includes a forward motion compensation unit 321, a backward motion compensation unit 322, an adder 323, and a multiplier 324.

The forward motion compensation unit 321 executes forward motion compensation processing to acquire each pixel value of coordinates (x, y) in the normal interpolated image based on the forward motion vector $v_{n\_L}$. Specifically, the pixel value "succ" in the original image $F_n$, which is obtained by Expression 9, is acquired as a pixel value at the coordinates (x, y) in the normal interpolated image. The forward motion compensation unit 321 supplies the acquired pixel value to the adder 323.

The backward motion compensation unit 322 executes backward motion compensation processing to acquire each pixel value of coordinates (x, y) in the normal interpolated image based on the backward motion vector $V_{n-1\_L}$. Specifically, the pixel value "prev" in the original image $F_{n-1}$, which is obtained by Expression 10, is acquired as a pixel value at the coordinates (x, y) in the normal interpolated image. The backward motion compensation unit 322 supplies the acquired pixel value to the adder 323.

The adder 323 adds the input values. The adder 323 receives an input of the pixel value "succ" acquired by the forward motion compensation unit 321 and an input of the pixel value "prev" acquired by the backward motion compensation unit 322. The adder 323 adds those input values and supplies the resultant value to the multiplier 324.

The multiplier 324 multiplies the input value by a predetermined value. The multiplier 324 receives an input of the additional value supplied from the adder 323. The multiplier 324 multiplies the input value by 0.5 and supplies the resultant value, which is the pixel value "out" in the normal interpolated image MC_N, to the combination unit 370.

The adder 323 and the multiplier 324 implement an arithmetic operation of Expression 11 when the interpolation position parameter of Relpos is 0.5.

Note that the normal interpolated image generation unit 320 executes both of the forward motion compensation processing and the backward motion compensation processing, but it may execute any one of the forward motion compensation processing and the backward motion compensation processing. In this case, the normal interpolated image generation unit 320 includes one of the forward motion compensation unit 321 and the backward motion compensation unit 322 and does not include the other motion compensation unit, the adder 323, and the multiplier 324. Subsequently, a pixel value generated by any one of the forward motion compensation unit 321 and the backward motion compensation unit 322 is output without change to the combination unit 370, to serve as the pixel value of the normal interpolated image.

Figure 7A:
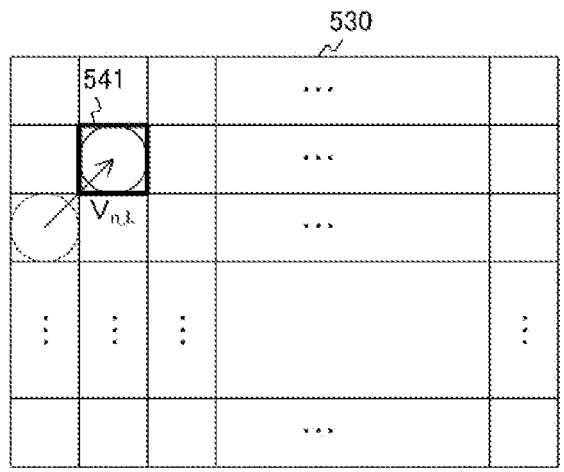
FIGS. 7A, 7B, and 7C are each a diagram for describing a method of generating a normal interpolated image in the first embodiment.
Figure 7B:
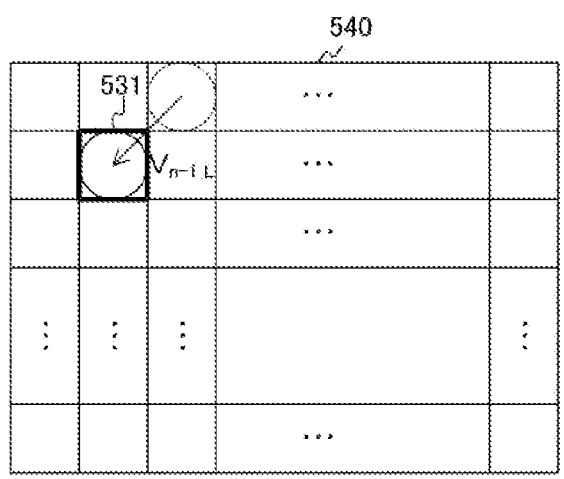
Figure 7C:
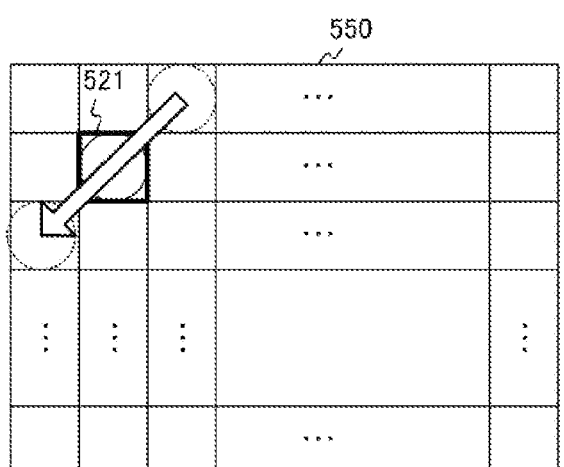

FIGS. 7A, 7B, and 7C are each a diagram for describing a method of generating a normal interpolated image in the first embodiment. FIG. 7A is an example of a forward motion compensation image 530 generated by the forward motion compensation unit 321. The forward motion compensation unit 321 uses Expression 9 to acquire, from the original image $F_n$, a pixel value "succ" of a pixel that is located at a position to which a pixel at coordinates (x, y) in a target block 541 of the forward motion compensation image 530 is moved along the forward motion vector $V_{n\_L}$. This pixel value "succ" is used as a pixel value of the pixel at coordinates (x, y) in the target block 541. In other words, the forward motion compensation image 530 is generated using a pixel obtained by moving the pixel of the original image $F_n$ according to the forward motion vector $V_{n\_L}$.

FIG. 7B is an example of a backward motion compensation image 540 generated by the backward motion compensation unit 322. The backward motion compensation unit 322 uses Expression 10 to acquire, from the original image $F_{n-1}$, a pixel value "prev" of a pixel that is located at a position to which a pixel at coordinates (x, y) in a target block 531 of the backward motion compensation image 540 is moved along the backward motion vector $V_{n-1\_L}$. This pixel value "prev" is used as a pixel value of the pixel at coordinates (x, y) in the target block 541. In other words, the backward motion compensation image 540 is generated using a pixel obtained by moving the pixel of the original image $F_{n-1}$ according to the backward motion vector $V_{n-1\_L}$.

FIG. 7C is a diagram showing an example of a normal interpolated image 550 generated by combining the forward motion compensation image 530 shown in FIG. 7A and the backward motion compensation image 540 shown in FIG. 7B based on Expression 11. The forward motion vector $V_{n\_L}$ and the backward motion vector $V_{n-1\_L}$ are vectors obtained when the local motion vector $mv_L$ is divided. Consequently, images in which pixels are moved according to those forward motion vector $V_n$ and backward motion vector $V_{n-1}$ are combined to each other, and a block located between the blocks moved according to the local motion vector $mv_L$ is interpolated.

(Configuration Example of High-frequency Area Extraction Unit)

Figure 8:
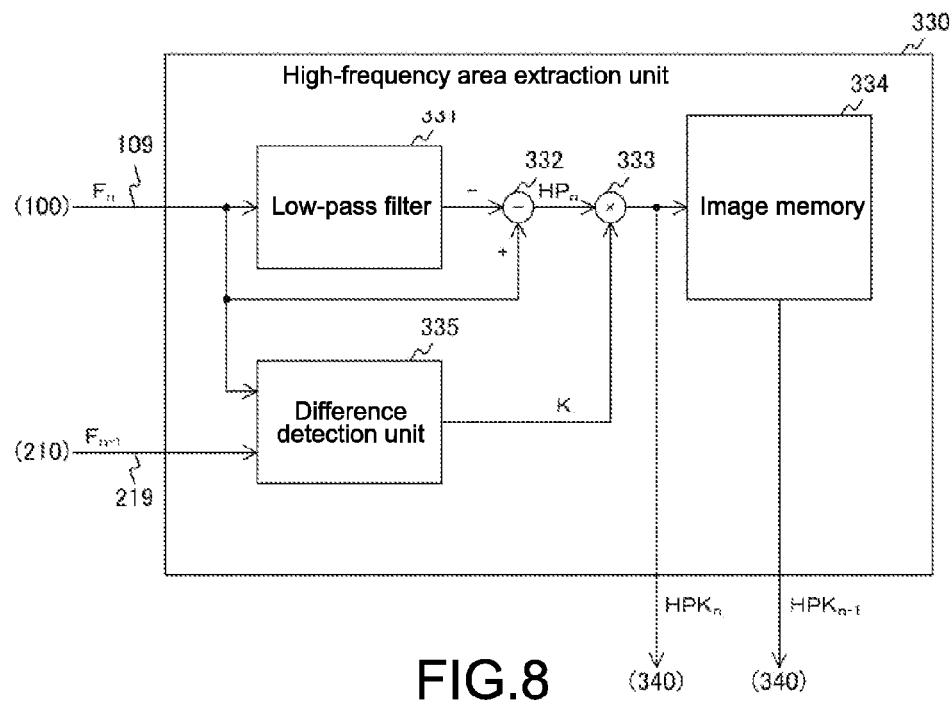
FIG. 8 is a block diagram showing a configuration example of a high-frequency area extraction unit in the first embodiment.

FIG. 8 is a block diagram showing a configuration example of the high-frequency area extraction unit 330 in the first embodiment. The high-frequency area extraction unit 330 includes a low-pass filter 331, a subtracter 332, a multiplier 333, an image memory 334, and a difference detection unit 335.

The low-pass filter 331 extracts a low-frequency area $LP_n$ from the original image $F_n$, the low-frequency area $LP_n$ having a spatial frequency lower than a predetermined value. The low-pass filter 331 is achieved by a FIR (Finite Impulse Response) filter, for example. The low-pass filter 331 supplies a pixel value of each pixel in the extracted low-frequency area $LP_n$ to the subtracter 332.

The subtracter 332 subtracts one of two input values from the other value. The subtracter 332 sequentially receives an input of the pixel value in the low-frequency area $LP_n$ extracted by the low-pass filter 331 and an input of the pixel value in the original image $F_n$. The subtracter 332 subtracts the pixel value in the low-frequency area $LP_n$ from the pixel value in the original image $F_n$ and supplies the resultant value, which is a pixel value of the high-frequency area $HP_n$, to the multiplier 333.

Note that the high-frequency area extraction unit 330 extracts the high-frequency area $HP_n$ by the low-pass filter 331 and the subtracter 332, but the high-frequency area extraction unit 330 may include a high-pass filter instead of the low-pass filter 331 and the subtracter 332 and extract the high-frequency area $HP_n$ by performing high-pass filtering on the original image $F_n$. Further, the low-pass filter 331 and the subtracter 332 are examples of a filter unit in the section "What is claimed is".

The difference detection unit 335 detects a difference in pixel value between the original images $F_n$ and $F_{n-1}$ for each pixel. The difference detection unit 335 detects a difference value k for each pixel. The difference detection unit 335 generates difference data K formed of those difference values k. The difference detection unit 335 sequentially supplies each of the difference values k in the difference data K to the multiplier 333.

The multiplier 333 multiplies the input values. The multiplier 333 receives an input of the difference value k in the difference data $K_n$ and an input of the pixel value in the high-frequency area $HP_n$. The multiplier 333 multiplies those input values and supplies the resultant value, which is a pixel value in the high-frequency area $HPK_n$, to the global motion vector detection unit 340 and the combination ratio determination unit 360. Further, the multiplier 333 stores the multiplied value in the image memory 334. Note that the multiplier 333 is an example of an increase unit in the section "What is claimed is".

The multiplier 333 multiplies the pixel value of the high-frequency area $HP_n$ by the difference value k, so that the pixel value of the high-frequency area that moves between the original images $F_n$ and $F_{n-1}$ is amplified. Consequently, the global motion vector detection unit 340 can easily detect a vector, which indicates a moving direction of the high-frequency area with motion, as a global motion vector. Further, since the pixel value of the high-frequency area with motion is amplified, the combination ratio of the high-frequency area with motion can be preferentially increased.

The image memory 334 stores the high-frequency area. The global motion vector detection unit 340 and the combination ratio determination unit 360 read out the high-frequency area stored in the image memory 334 when the next high-frequency area is generated, so that a delayed high-frequency area $HPK_{n-1}$ can be acquired.

(Configuration Example of Difference Detection Unit)

Figure 9:
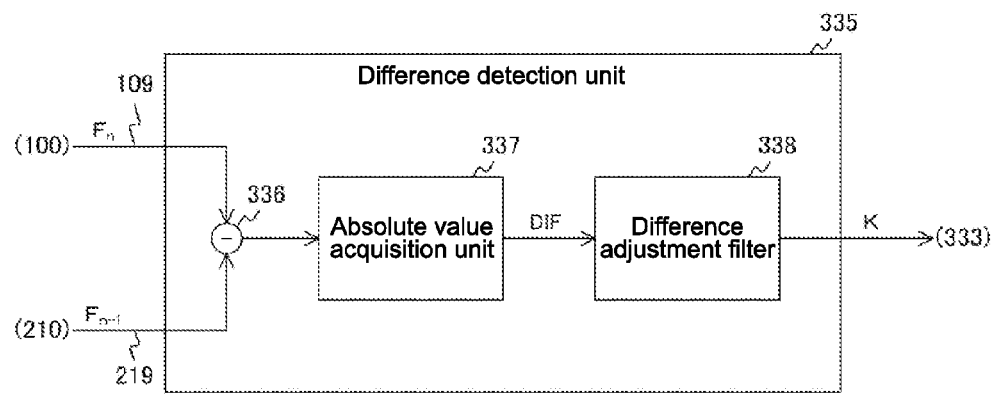
FIG. 9 is a block diagram showing a configuration example of a difference detection unit in the first embodiment.

FIG. 9 is a block diagram showing a configuration example of the difference detection unit 335 in the first embodiment. The difference detection unit 335 includes a subtracter 336, an absolute value acquisition unit 337, and a difference adjustment filter 338.

The subtracter 336 subtracts one of the two input values from the other value. The subtracter 336 sequentially receives an input of a pixel value of a pixel in the original image $F_n$ and an input of a pixel value of a pixel in the original image $F_{n-1}$. The subtracter 336 subtracts one of those input values from the other value and supplies the resultant value, i.e., a difference of the pixel values, to the absolute value acquisition unit 337.

The absolute value acquisition unit 337 acquires an absolute value of the input value. The absolute value acquisition unit 337 sequentially receives an input of the difference supplied from the subtracter 336. The absolute value acquisition unit 337 supplies data formed of absolute values diff of the differences, which serves as difference absolute value data DIF, to the difference adjustment filter 338.

The difference adjustment filter 338 adjusts each absolute value diff in the difference absolute value data DIF. For example, each time an absolute value is input, the difference adjustment filter 338 uses the following expression to calculate a value obtained by amplifying the absolute value, and sets the resultant value as a difference value k. The difference adjustment filter 338 outputs data formed of those difference values k, as difference data K, to the multiplier 333.

$$\begin{cases} k = 0 & (\text{diff} \leq Th_{d1}) \\ k = a \times \text{diff} + b & (Th_{d1} < \text{diff} < Th_{d2}) \\ k = 255 & (\text{diff} \geq Th_{d2}) \end{cases} \quad \text{Expression 17}$$

In Expression 17, "a" and "b" are factors, each of which is a real number. Further, $Th_{d1}$ is a threshold larger than 0 and smaller than $Th_{d2}$, and $Th_{d2}$ is a threshold larger than $Th_{d1}$ and smaller than 255.

Note that Expression 17 assumes that the pixel value has a value expressed in 8 bits, specifically, a value ranging from 0 to 255, but the number of bits assigned to the pixel value is not limited to 8 bits. For example, the pixel value may be expressed in 10 bits. In such a case, in Expression 17, "255" is replaced with "1023".

The difference adjustment filter 338 amplifies the absolute value, so that the pixel value of the high-frequency area with motion is increased. Consequently, the global motion vector can be easily detected and the combination ratio of the high-frequency area with motion is preferentially set to be high.

Note that the difference adjustment filter 338 amplifies the absolute value of the difference, but the difference adjustment filter 338 may output the absolute value as the difference value k without performing amplification. Further, the difference adjustment filter 338 may attenuate the absolute value. When the absolute value of the difference is extremely large, there is a possibility that motion of a noise component is erroneously detected as a global motion vector. In this case, the attenuation of the absolute value suppresses an occurrence of a false detection. Additionally, when the absolute value of the difference is extremely large, there is a possibility that an inappropriate combination ratio is determined based on the noise component. In this case, the attenuation of the absolute value allows an appropriate combination ratio to be determined.

(Configuration Example of High-frequency Area Interpolated Image Generation Unit)

Figure 10:
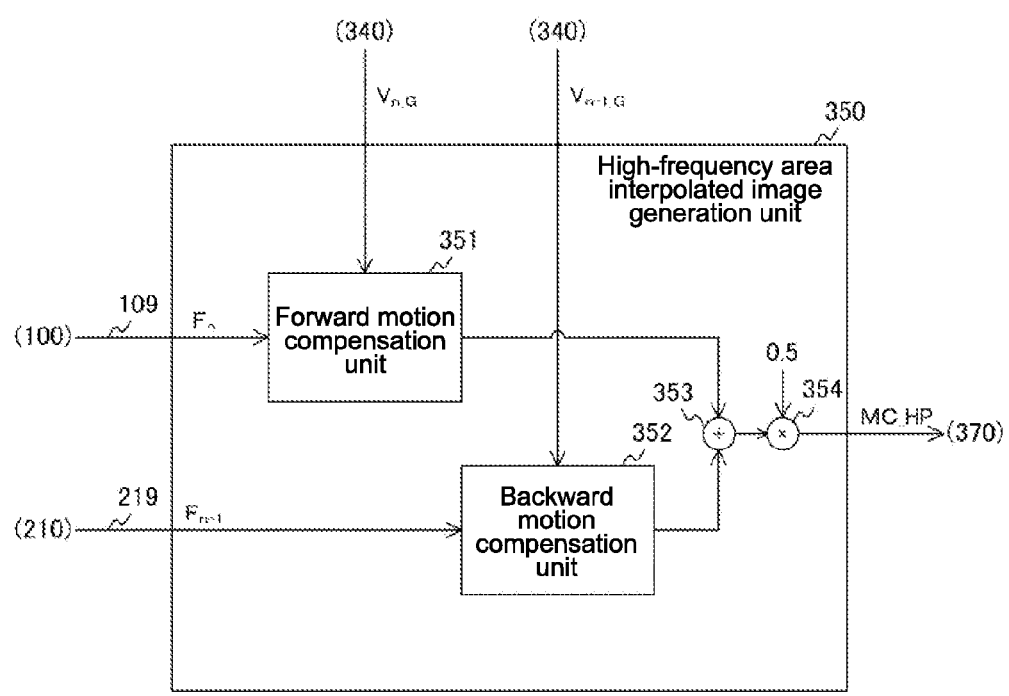
FIG. 10 is a block diagram showing a configuration example of a high-frequency area interpolated image generation unit in the first embodiment.

FIG. 10 is a block diagram showing a configuration example of the high-frequency area interpolated image generation unit 350 in the first embodiment. The high-frequency area interpolated image generation unit 350 includes a forward motion compensation unit 351, a backward motion compensation unit 352, an adder 353, and a multiplier 354.

The configuration of the forward motion compensation unit 351 is the same as that of the forward motion compensation unit 321 in the normal interpolated image generation unit 320 except that the forward motion compensation processing is executed based on the forward motion vector $v_{n\_G}$ instead of the forward motion vector $V_{n\_L}$. The forward motion compensation unit 351 supplies each pixel value "succ" acquired by the forward motion compensation processing to the adder 353.

The configuration of the backward motion compensation unit 352 is the same as that of the backward motion compensation unit 322 in the normal interpolated image generation unit 320 except that the backward motion compensation processing is executed based on the backward motion vector $v_{n-1\_G}$ instead of the backward motion vector $V_{n-1\_L}$. The backward motion compensation unit 352 supplies each pixel value "prev" acquired by the backward motion compensation processing to the adder 353.

The adder 353 adds the input values. The adder 353 receives an input of the pixel value "succ" acquired by the forward motion compensation unit 351 and an input of the pixel value "prev" acquired by the backward motion compensation unit 352. The adder 353 adds those input values and supplies the resultant value to the multiplier 354.

The multiplier 354 multiplies the input value by a predetermined value. The multiplier 354 receives an input of the additional value supplied from the adder 353. The multiplier 354 multiplies the input value by 0.5 and supplies the resultant value, which is the pixel value "out" in the high-frequency area interpolated image MC_HP, to the combination unit 370.

Note that the high-frequency area interpolated image generation unit 350 executes both of the forward motion compensation processing and the backward motion compensation processing, but it may execute any one of the forward motion compensation processing and the backward motion compensation processing. In this case, the high-frequency area interpolated image generation unit 350 includes one of the forward motion compensation unit 351 and the backward motion compensation unit 352 and does not include the other motion compensation unit, the adder 353, and the multiplier 354. Subsequently, a pixel value generated by any one of the forward motion compensation unit 351 and the backward motion compensation unit 352 is output without change to the combination unit 370, to serve as the pixel value of the normal interpolated image.

(Configuration Example of Combination Ratio Determination Unit)

Figure 11:
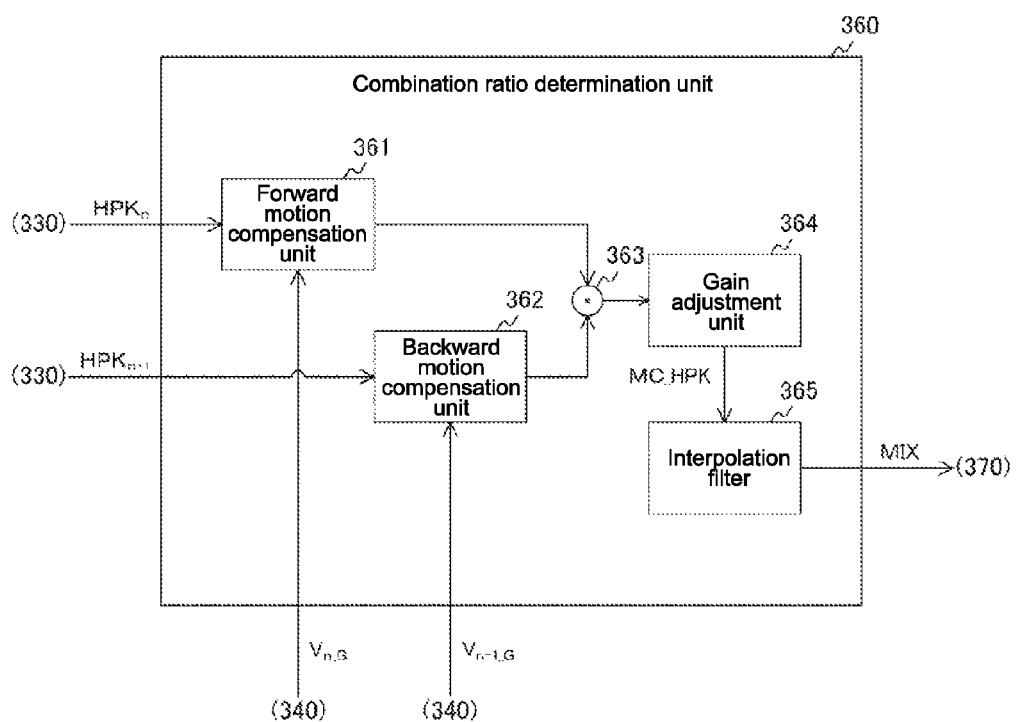
FIG. 11 is a block diagram showing a configuration example of a combination ratio determination unit in the first embodiment.

FIG. 11 is a block diagram showing a configuration example of the combination ratio determination unit 360 in the first embodiment. The combination ratio determination unit 360 includes a forward motion compensation unit 361, a backward motion compensation unit 362, a multiplier 363, a gain adjustment unit 364, and an interpolation filter 365.

The configuration of the forward motion compensation unit 361 is the same as that of the forward motion compensation unit 351 in the high-frequency area interpolated image generation unit 350 except that the forward motion compensation processing is executed based on the high-frequency area $HPK_n$ instead of the original image $F_n$. The forward motion compensation unit 361 supplies each pixel value "succ" acquired by the forward motion compensation processing to the multiplier 363.

The configuration of the backward motion compensation unit 362 is the same as that of the backward motion compensation unit 352 in the high-frequency area interpolated image generation unit 350 except that the backward motion compensation processing is executed based on the high-frequency area $HPK_{n-1}$ instead of the original image $F_{n-1}$. The backward motion compensation unit 362 supplies each pixel value "prev" acquired by the backward motion compensation processing to the multiplier 363.

The multiplier 363 multiplies the input values. The multiplier 363 receives an input of the pixel value "succ" acquired by the forward motion compensation unit 361 and an input of the pixel value "prev" acquired by the backward motion compensation unit 362. The multiplier 363 multiplies those input values and supplies the resultant value to the gain adjustment unit 364.

The multiplier 363 multiplies the pixel value "succ" and the pixel value "prev", so that the pixel value of the high-frequency area is amplified more than when the input values are added. Consequently, the combination ratio of the high-frequency area is preferentially set to be high.

The gain adjustment unit 364 adjusts a gain and attenuates the pixel value supplied from the multiplier 363. The gain adjustment unit 364 attenuates the pixel value from the multiplier 363 such that the value falls within a certain range through the gain adjustment. For example, when a pixel value has the data size of 8 bits and such pixel values are multiplied, the data size of the resultant value after the multiplication is 16 bits. The multiplication result is attenuated such that its data size is changed to 8 bits. The gain adjustment unit 364 supplies the adjusted pixel value to the interpolation filter 365.

The interpolation filter 365 interpolates, in an image MC_M formed of the pixel values generated by the gain adjustment unit 364, a portion where the edge interrupts, to generate the combination ratio data MIX. The interpolation filter 365 uses the following expression to perform interpolation, for example. The interpolation filter 365 supplies the generated combination ratio data MIX to the combination unit 370.

$$\text{MIX}(x,y) = \max\{MC\_M(x-1,y), MC\_M(x,y), MC\_M(x+1,y)\} \quad \text{Expression 18}$$

In Expression 18, MC_M(x, y) represents a pixel value of a pixel at coordinates (x, y) in the image MC_M. MIX(x, y) represents a pixel value of a pixel at coordinates (x, y) in the combination ratio data MIX. max( ) represents a maximum value of the pixel value in parentheses.

(Configuration Example of Combination Unit)

Figure 12:
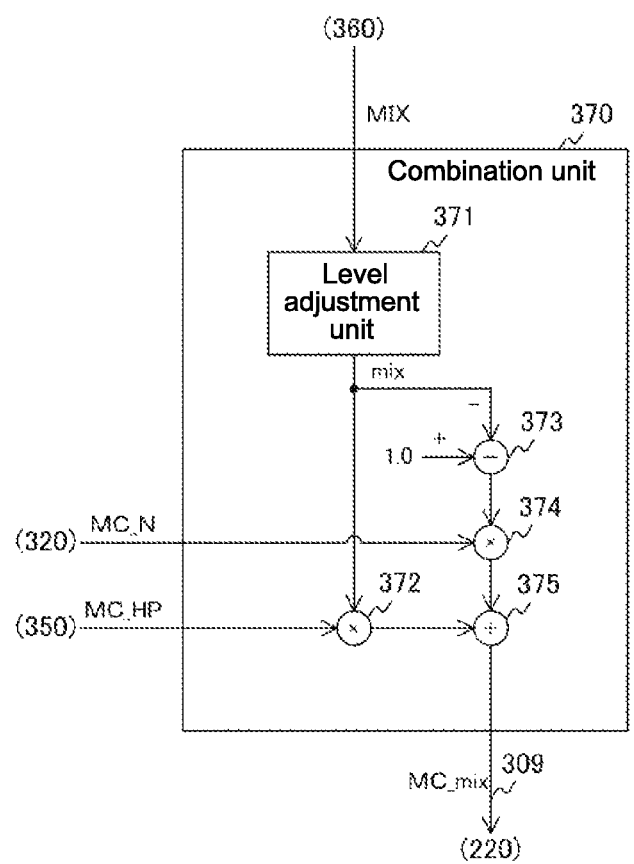
FIG. 12 is a block diagram showing a configuration example of a combination unit in the first embodiment.

FIG. 12 is a block diagram showing a configuration example of the combination unit 370 in the first embodiment. The combination unit 370 includes a level adjustment unit 371, a multiplier 372, a subtracter 373, a multiplier 374, and an adder 375.

The level adjustment unit 371 adjusts the pixel value in the combination ratio data MIX so as to fall within the range from 0 to 1. For example, when the pixel value takes a value within the range from 0 to 255, the level adjustment unit 371 divides the pixel value by 255 to adjust the resultant value to a value falling within the range from 0 to 1. The level adjustment unit 371 sequentially supplies each of the adjusted values, which is a combination ratio mix, to the subtracter 373 and the multiplier 372.

The multiplier 372 multiplies the input values. The multiplier 372 receives an input of the combination ratio mix supplied from the level adjustment unit 371 and an input of the pixel value in the high-frequency area interpolated image MC_HP. The multiplier 372 multiplies those input values and supplies the resultant value to the adder 375.

The subtracter 373 subtracts the input value from a predetermined value. The subtracter 373 receives an input of the combination ratio mix supplied from the level adjustment unit 371. The subtracter 373 subtracts the combination ratio mix from 1.0 and supplies the resultant value (1.0−mix) to the multiplier 374.

The multiplier 374 multiplies the input values. The multiplier 374 receives an input of the value (1.0−mix) supplied from the subtracter 373 and an input of the pixel value in the normal interpolated image MC_N. The multiplier 374 multiplies those input values and supplies the resultant value to the adder 375.

The adder 375 adds the input values. The adder 375 receives inputs of the multiplication results of the respective multipliers 372 and 374. The adder 375 adds those input values and stores, in the image memory 220, the resultant value serving as a pixel value in the combined interpolated image MC_mix.

To sum it up, the multiplier 372, the subtracter 373, the multiplier 374, and the adder 375 execute the following arithmetic operation of Expression 19 below.

$$MC\_mix(x,y) = MC\_N(x,y) \times (1.0 - \text{mix}) + MC\_HP(x,y) \times \text{mix} \quad \text{Expression 19}$$

In Expression 19, MC_mix(x, y) represents a pixel value of a pixel at coordinates (x, y) in the combined interpolated image MC_mix. MC_N(x, y) represents a pixel value of a pixel at coordinates (x, y) in the normal interpolated image MC_N. MC_HP(x, y) represents a pixel value of a pixel at coordinates (x, y) in the high-frequency area interpolated image MC_HP. mix represents a combination ratio generated by the level adjustment unit 371 based on the pixel value at coordinates (x, y) in the combination ratio data MIX.

Figure 13:
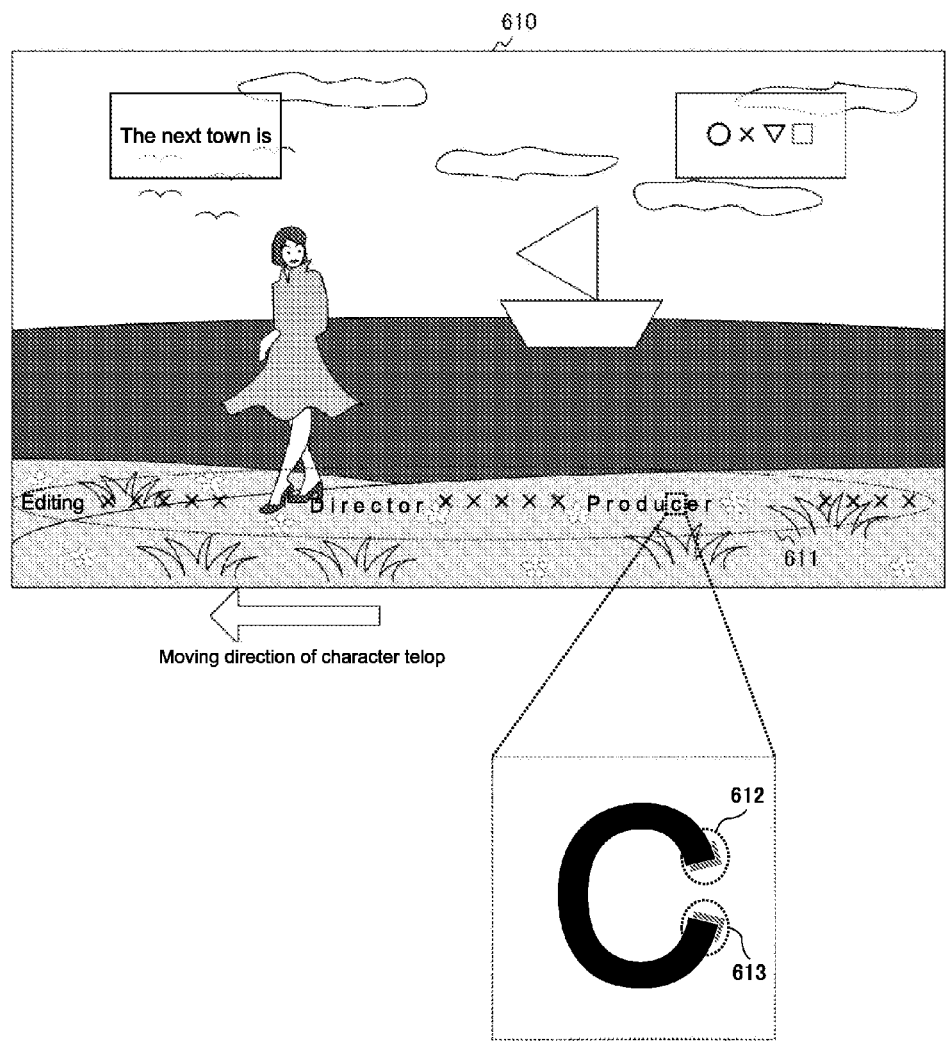
FIG. 13 is a diagram showing an example of the normal interpolated image in the first embodiment.

FIG. 13 is a diagram showing an example of a normal interpolated image 610 in the first embodiment. Here, it is assumed that the image processing apparatus 200 receives an input of a moving image in which a character telop, which moves in a horizontal direction with the lapse of time, is displayed on a lower portion of a screen. The image processing apparatus 200 generates the normal interpolated image 610 from the original images $F_n$ and $F_{n-1}$ in the moving image. The normal interpolated image 610 includes a character telop 611 in its lower portion. Note that characters are also displayed above the character telop 611, but those character portions do not move with the lapse of time.

As described above, the image processing apparatus 200 detects a local motion vector for each block and moves the block in the original image based on the local motion vector, to generate the normal interpolated image 610. As to the area of the character telop, the entire area moves in the horizontal direction, and thus all the values of the local motion vectors in the character telop are thought to be the same.

When a lot of blocks exist in the character telop, however, there is a case where a vector with a value, which is different from values of local motion vectors of adjacent blocks, may be detected from some blocks in the character telop. In this case, the local motion vector of such a block does not have a correct value, and it is evaluated that the local motion vector detection has failed.

A movement amount of the block for which the local motion vector detection has failed is different from an actual movement amount of the character telop, and thus a blur occurs in a boundary between the block for which the detection has failed and a block for which the detection has not failed. For example, in the character telop 611 in the normal interpolated image 610, blurs occur at a plurality of portions such as blurs 612 and 613.

Figure 14:
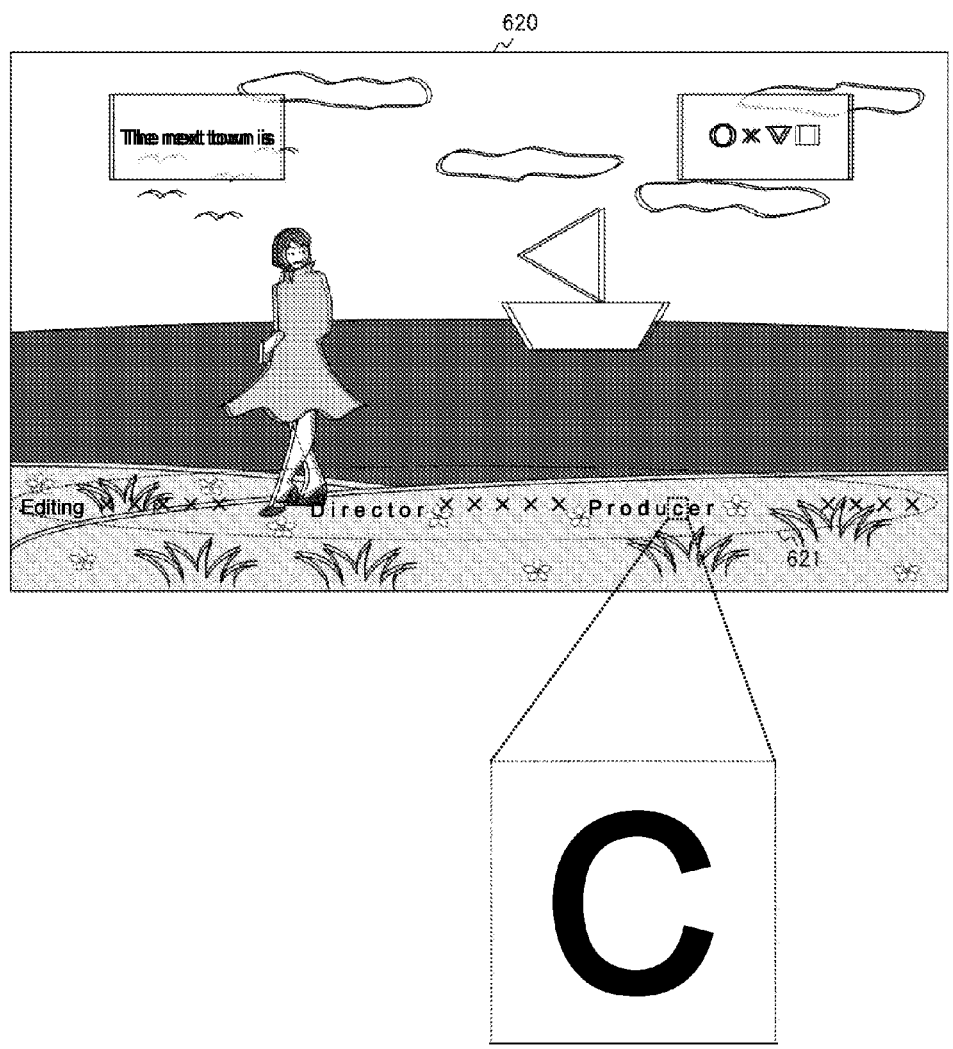
FIG. 14 is a diagram showing an example of a high-frequency area interpolated image in the first embodiment.

FIG. 14 is a diagram showing an example of a high-frequency area interpolated image 620 in the first embodiment. The image processing apparatus 200 moves the entire original image according to the global motion vectors each indicating the movement of a character telop 621 and generates the high-frequency area interpolated image 620, so that no blurs occur in the character telop 621. On the other hand, since the entire original image is moved according to the global motion vectors irrespective of no movements at portions other than the character telop 621, blurs occur at the portions other than the character telop 621.

Figure 15:
FIG. 15 is a diagram showing an example of combination ratio data in the first embodiment.

FIG. 15 is a diagram showing an example of combination ratio data 630 in the first embodiment. The combination ratio data 630 is image data including, in the high-frequency area with motion, a pixel whose pixel value is amplified. For that reason, a pixel value of the character telop portion extracted as a high-frequency area with motion is higher than those of the other portions. Consequently, the value of the combination ratio mix in the character telop portion is set to be higher than those of the other portions.

Figure 16:
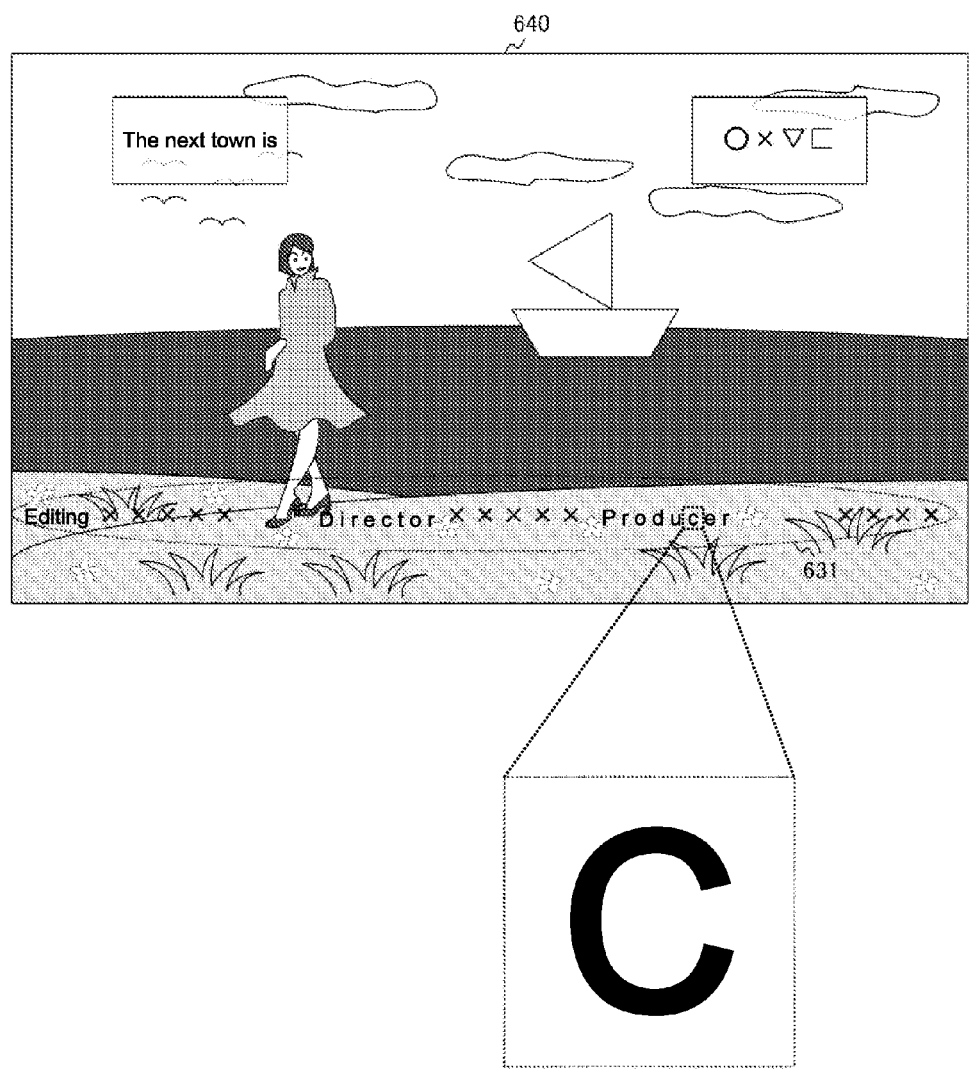
FIG. 16 is a diagram showing an example of a combined interpolated image in the first embodiment.

FIG. 16 is a diagram showing an example of a combined interpolated image 640 in the first embodiment. The image processing apparatus 200 combines the normal interpolated image 610 and the high-frequency area interpolated image 620 based on the combination ratio data 630. In the combination ratio data 630, the combination ratio of the character telop portion is set to be higher. Consequently, a combined interpolated image 640 in which the ratio of the high-frequency area interpolated image 620 is higher in a character telop 631 and the ratio of the normal interpolated image 610 is higher in the other portions is generated. No blurs occur in the character telop in the high-frequency area interpolated image 620, and no blurs occur in portions other than the character telop in the normal interpolated image 610. Consequently, no blurs occur as a whole in the combined interpolated image 640, which is obtained by combining the images with a high ratio of the portions having no blurs. The combined interpolated image 640 is interpolated in the original image. This allows an improvement of the image quality of a moving image whose frame rate is converted.

(Operation Example of Image Processing Apparatus)

Figure 17:
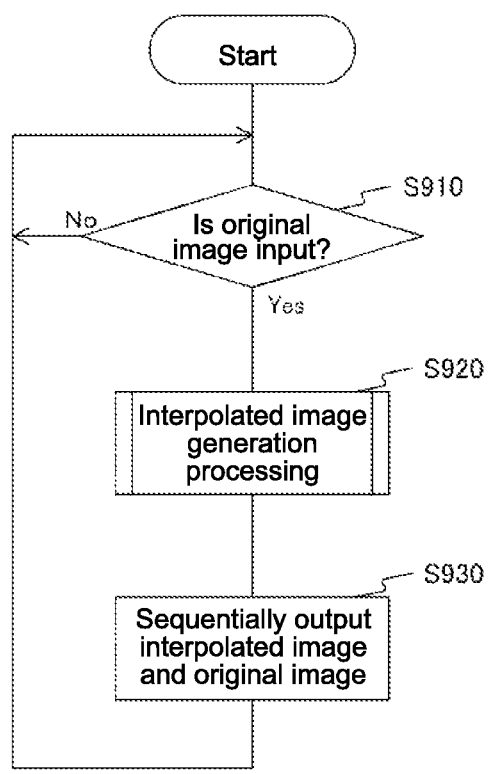
FIG. 17 is a flowchart showing an example of an operation of the image processing apparatus in the first embodiment.

FIG. 17 is a flowchart showing an example of an operation of the image processing apparatus 200 in the first embodiment. This operation is started when the image processing apparatus 200 executes the processing to convert the frame rate, for example.

The image processing apparatus 200 determines whether an original image is input or not (Step S910). When an original image is input (Step S910: Yes), the image processing apparatus 200 executes interpolated image generation processing to generate a combined interpolated image (Step S920). Subsequently, the image processing apparatus 200 outputs the interpolated image and the original image in a time-series order (Step S930). When an original image is not input (Step S910: No), or after the processing of Step S930 is performed, the image processing apparatus 200 returns to the processing of Step S910.

Figure 18:
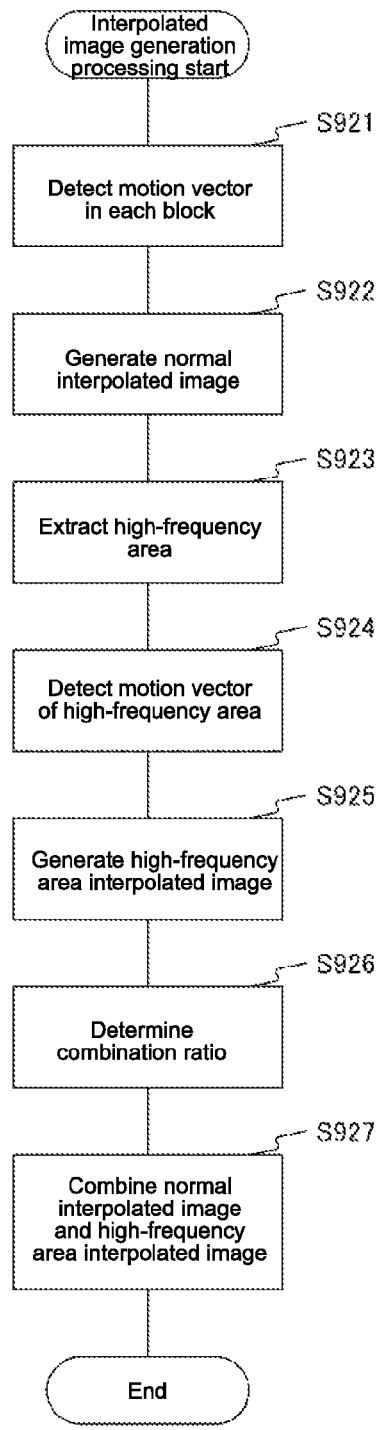
FIG. 18 is a flowchart showing an example of interpolated image generation processing in the first embodiment.

FIG. 18 is a flowchart showing an example of the interpolated image generation processing in the first embodiment. The interpolated image generation unit 300 of the image processing apparatus 200 detects a local motion vector for each block (Step S921). Subsequently, the interpolated image generation unit 300 generates a normal interpolated image from original images based on the local motion vector (Step S922).

The interpolated image generation unit 300 extracts a high-frequency area from the original images (Step S923). Subsequently, the interpolated image generation unit 300 detects a motion vector of the high-frequency area as a global motion vector (Step S924). The interpolated image generation unit 300 generates a high-frequency area interpolated image from the original images based on the global motion vector (Step S925).

The interpolated image generation unit 300 determines a combination ratio for each pixel based on the high-frequency areas (Step S926). Subsequently, the interpolated image generation unit 300 combines the normal interpolated image and the high-frequency area interpolated image according to the combination ratio (Step S927). After Step S927, the interpolated image generation unit 300 terminates the interpolated image generation processing.

As described above, according to the first embodiment, the image processing apparatus 200 combines the high-frequency area interpolated image and the normal interpolated image that are generated based on the change in position of the high-frequency area, to generate an interpolated image with no blurs in the high-frequency area. Additionally, the image processing apparatus 200 combines the normal interpolated image and the high-frequency area interpolated image, to generate an interpolated image in which a boundary between the high-frequency area and another area looks natural. Such an interpolated image is interpolated between the original images. This allows an improvement of the image quality of a moving image whose frame rate is converted.

Modified Example

Although the local motion vector is detected to generate the normal interpolated image in the first embodiment, the image processing apparatus 200 can also generate the normal interpolated image without detecting the local motion vector. The image processing apparatus 200 in a modified example is different from that of the first embodiment in that the local motion vector is not detected.

(Configuration Example of Interpolated Image Generation Unit)

Figure 19:
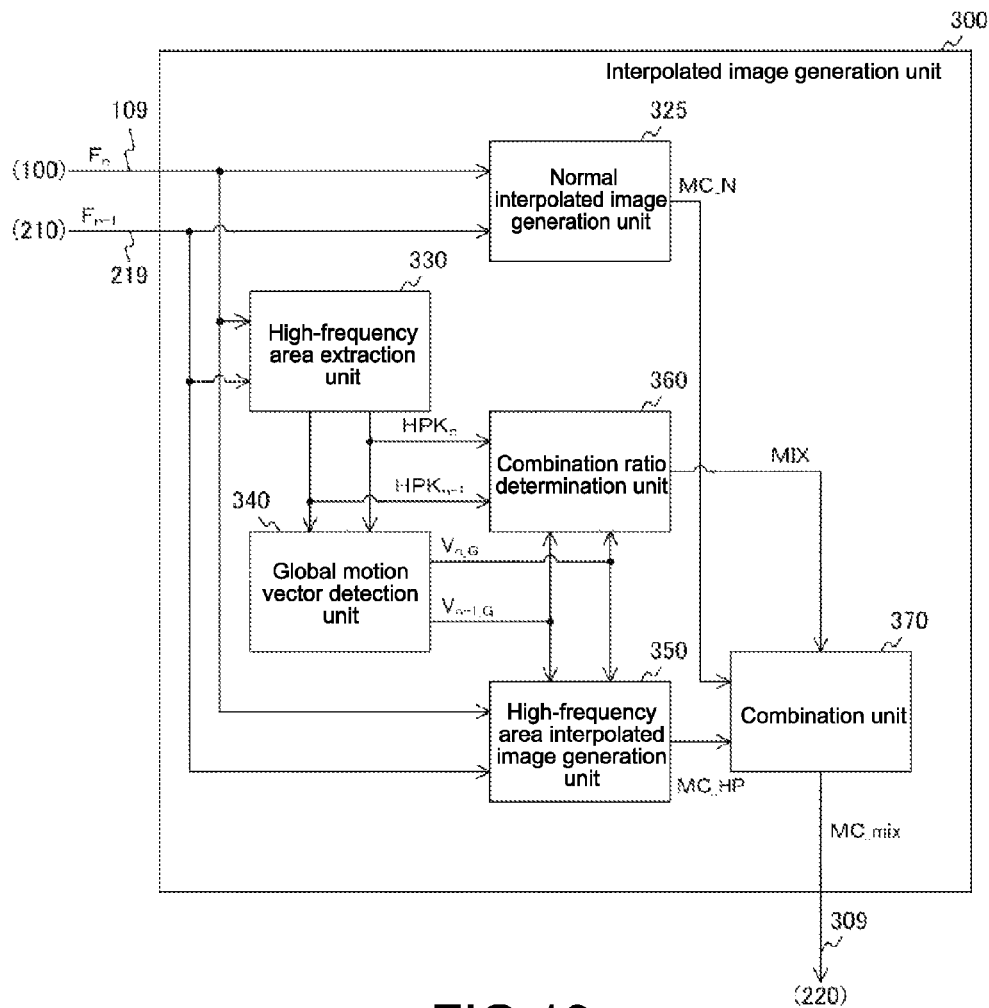
FIG. 19 is a block diagram showing a configuration example of an interpolated image generation unit in a modified example of the first embodiment.

FIG. 19 is a block diagram showing a configuration example of the interpolated image generation unit 300 in the modified example of the first embodiment. The interpolated image generation unit 300 in the modified example is different from that of the first embodiment in that a normal interpolated image generation unit 325 is provided instead of the local motion vector detection unit 310 and the normal interpolated image generation unit 320.

The normal interpolated image generation unit 325 combines the original images $F_n$ and $F_{n-1}$ to generate the normal interpolated image MC_N.

Figure 20:
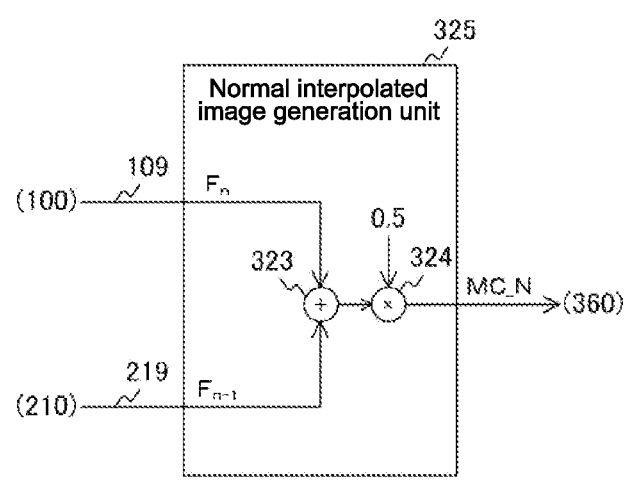
FIG. 20 is a block diagram showing a configuration example of a normal interpolated image generation unit in the modified example of the first embodiment.

FIG. 20 is a block diagram showing a configuration example of the normal interpolated image generation unit 325 in the modified example of the first embodiment. The normal interpolated image generation unit 325 includes an adder 323 and a multiplier 324.

The adder 323 adds the input values. The adder 323 receives an input of a pixel value in the original image $F_n$ and an input of a pixel value in the original image $F_{n-1}$. The adder 323 adds those input values and supplies the resultant value to the multiplier 324.

The multiplier 324 multiplies the input value by a predetermined value. The multiplier 324 receives an input of the additional value supplied from the adder 323. The multiplier 324 multiplies the input value by 0.5 and supplies the resultant value, which is the pixel value "out", to the combination unit 370. In such a manner, the normal interpolated image generation unit 325 generates a normal interpolated image without executing the motion compensation processing.

Note that the normal interpolated image generation unit 325 combines the original images $F_n$ and $F_{n-1}$ to generate the normal interpolated image, but it may use one of the original images without change as the normal interpolated image.

Figure 21:
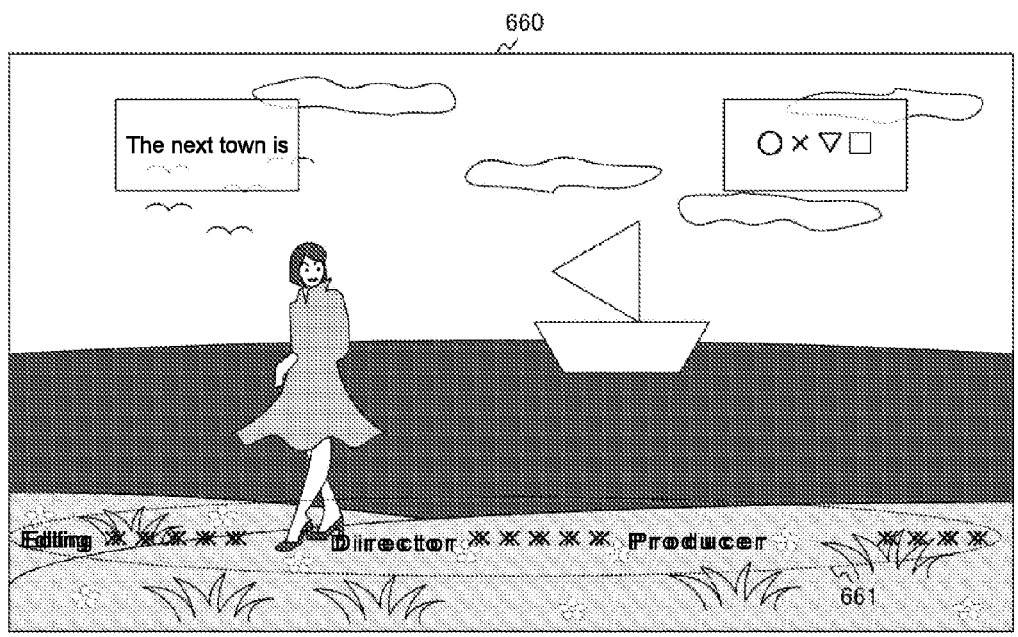
FIG. 21 is a diagram showing an example of a normal interpolated image in the modified example of the first embodiment.

FIG. 21 is a diagram showing an example of a normal interpolated image 660 in the modified example of the first embodiment. The normal interpolated image 660 is an image generated without performing a motion compensation, and hence blurs occur in a portion of a character telop 661 that moves in the horizontal direction. The normal interpolated image 660 is combined with a high-frequency area interpolated image having no blurs in the character telop. This suppresses the occurrence of blurs in a combined interpolated image that is to be eventually generated.

2. Second Embodiment

In the first embodiment, the image processing apparatus 200 amplifies the pixel value of the pixel in the high-frequency area according to the difference. However, the difference may include a noise component and it is desirable to execute coring processing to remove the noise component before the amplification. The image processing apparatus 200 of the second embodiment is different from that of the first embodiment in that the coring processing is performed on the difference.

(Configuration Example of Interpolated Image Generation Unit)

Figure 22:
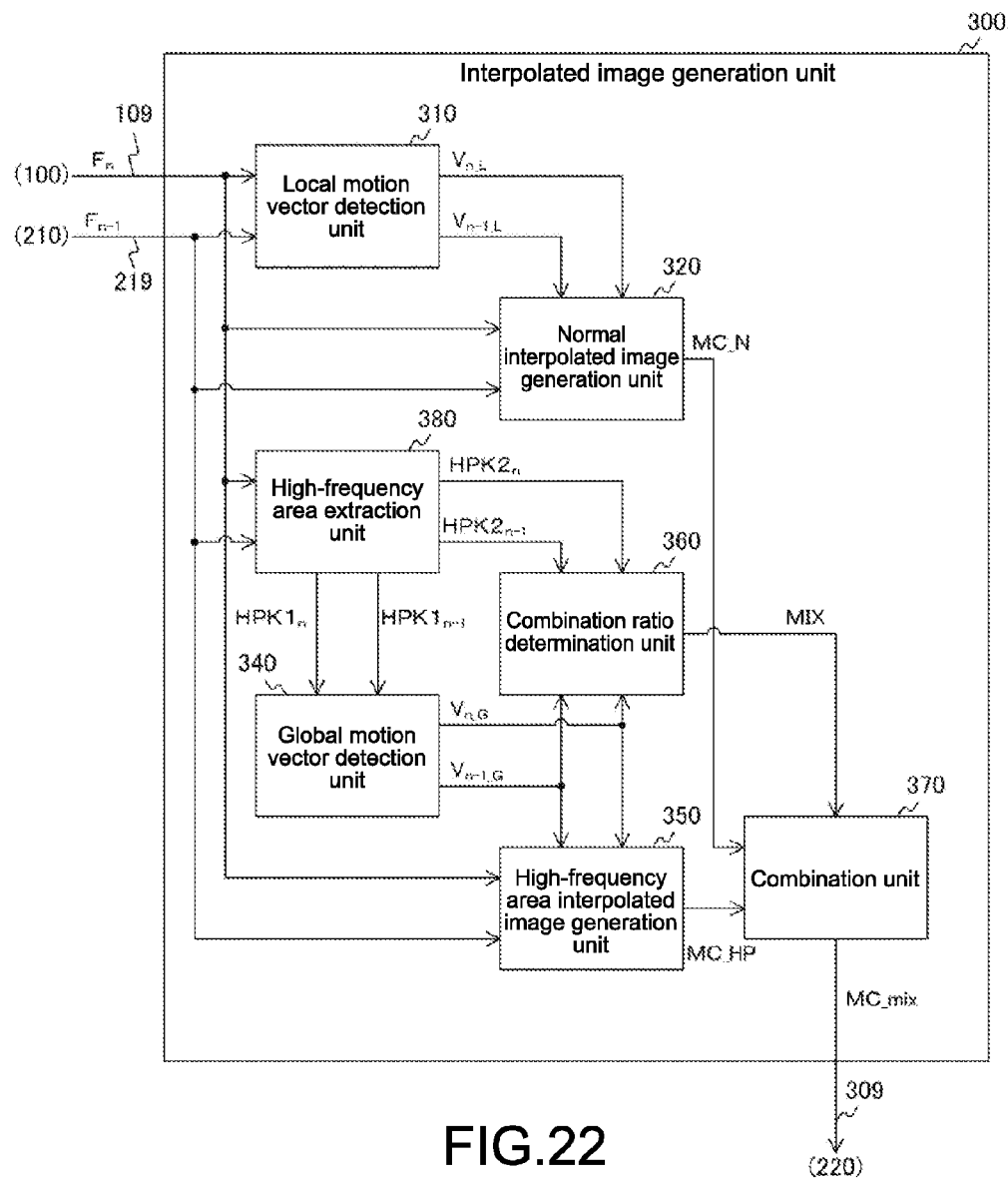
FIG. 22 is a block diagram showing a configuration example of an interpolated image generation unit in a second embodiment.

FIG. 22 is a block diagram showing a configuration example of the interpolated image generation unit 300 in the second embodiment. The interpolated image generation unit 300 in the second embodiment is different from that of the first embodiment in that a high-frequency area extraction unit 380 is provided instead of the high-frequency area extraction unit 330.

The high-frequency area extraction unit 380 executes the coring processing to remove a value smaller than a difference threshold $Th_{k1}$ from the difference values k, to generate a difference value k1. Additionally, the high-frequency area extraction unit 380 executes the coring processing to remove a value smaller than a difference threshold $Th_{k2}$ from the difference values k, to generate a difference value k2. The high-frequency area extraction unit 380 amplifies the pixel values of the high-frequency areas $HP_n$ and $HP_{n-1}$ in accordance with the difference value k1, to generate high-frequency areas $HPK1_n$ and $HPK1_{n-1}$. Additionally, the high-frequency area extraction unit 380 amplifies the pixel values of the high-frequency areas $HP_n$ and $HP_{n-1}$ in accordance with the difference value k2, to generate high-frequency areas $HPK2_n$ and $HPK2_{n-1}$.

The high-frequency area extraction unit 380 supplies the high-frequency areas $HPK1_n$ and $HPK1_{n-1}$ to the global motion vector detection unit 340 and supplies the high-frequency areas $HPK2_n$ and $HPK2_{n-1}$ to the combination ratio determination unit 360.

(Configuration Example of High-frequency Area Extraction Unit)

Figure 23:
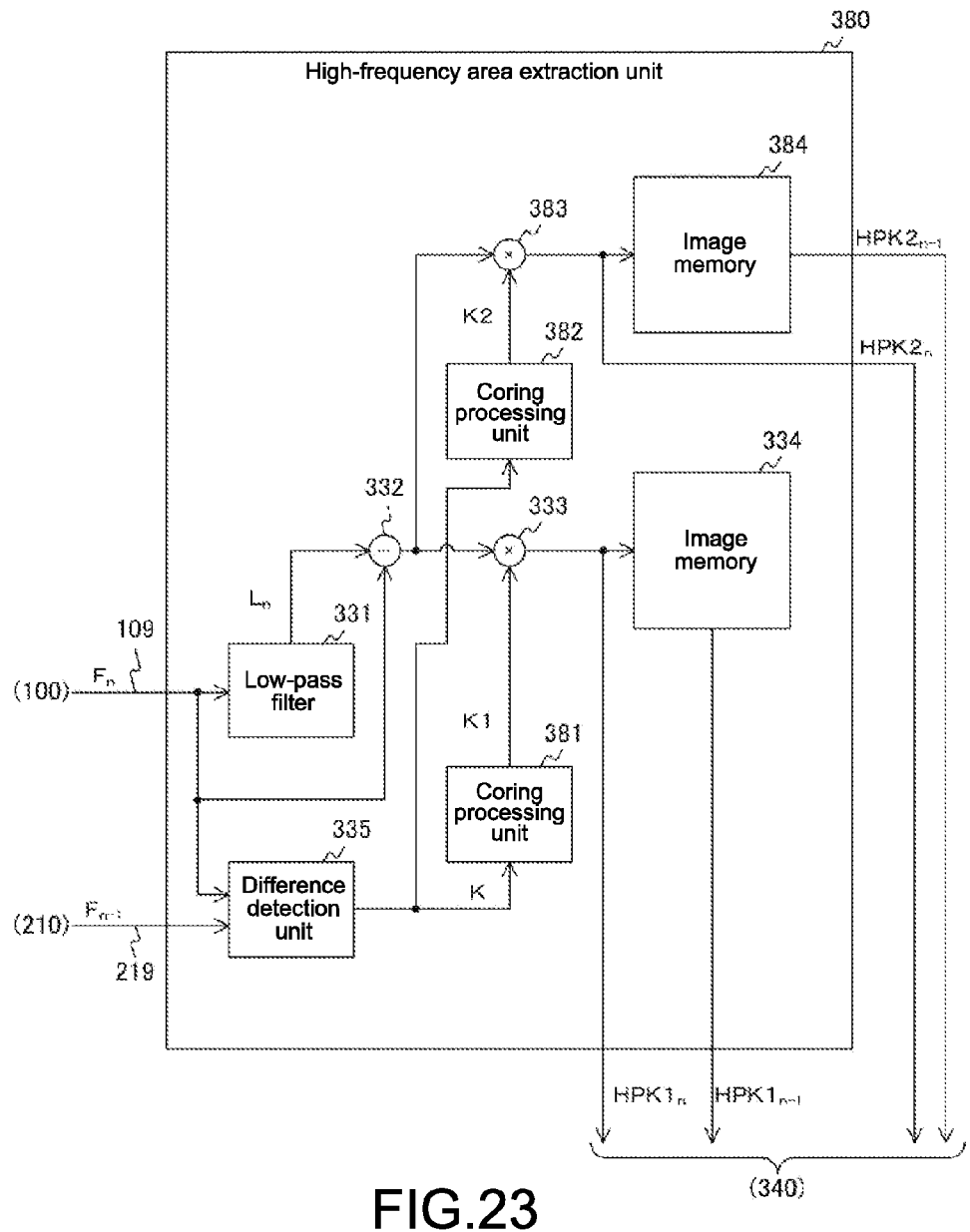
FIG. 23 is a block diagram showing a configuration example of a high-frequency area extraction unit in the second embodiment.

FIG. 23 is a block diagram showing a configuration example of the high-frequency area extraction unit 380 in the second embodiment. The high-frequency area extraction unit 380 is different from the high-frequency area extraction unit 330 in that coring processing units 381 and 382, a multiplier 383, and an image memory 384 are additionally provided.

The coring processing unit 381 executes the coring processing to remove the difference value k smaller than the difference threshold $Th_{k1}$. For example, the coring processing unit 381 uses the following expression to obtain the difference value k1 from the difference values k in the difference data K. The coring processing unit 381 supplies difference data K1 formed of the difference value k1 to the multiplier 333. Note that the coring processing unit 381 is an example of a first difference coring processing unit in the section "What is claimed is".

$$\begin{cases} k1 = 0 & (k < Th_{k1}) \\ k1 = k & (k \geq Th_{k1}) \end{cases} \qquad \text{Expression 20}$$

The multiplier 333 multiplies the pixel value in the high-frequency area $HP_n$ and the difference value k1 in the difference data K1. Data of the multiplication result, which serves as the high-frequency area $HPK1_n$, is supplied to the global motion vector detection unit 340.

The coring processing unit 382 executes the coring processing to remove the difference value k smaller than the difference threshold $Th_{k2}$. For example, the coring processing unit 382 uses the following expression to obtain the difference value k2 from the difference values k in the difference data K. The coring processing unit 382 supplies difference data K2 formed of the difference value k2 to the multiplier 383. Note that the coring processing unit 382 is an example of a second difference coring processing unit in the section "What is claimed is".

$$\begin{cases} k2 = 0 & (k < Th_{k2}) \\ k2 = k & (k \geq Th_{k2}) \end{cases} \qquad \text{Expression 21}$$

The multiplier 383 multiplies the input values. The multiplier 383 receives an input of the pixel value in the high-frequency area $HP_n$ and an input of the difference value k2 in the difference data K2. The multiplier 383 multiplies those input values, supplies data of the multiplication result, which serves as the high-frequency area $HPK2_n$, to the combination ratio determination unit 360, and causes the image memory 384 to store the data.

Note that the high-frequency area extraction unit 380 executes both of the coring processing using the difference threshold $Th_{k1}$ and the coring processing using the difference threshold $Th_{k2}$, but it may execute any one of the processing.

As described above, according to the second embodiment, the image processing apparatus 200 executes the coring processing to remove the difference smaller than the difference threshold, to remove the noise component from the difference. This allows the global motion vector to be easily detected and an appropriate combination ratio to be obtained.

Modified Example

In the second embodiment, the image processing apparatus 200 performs the coring processing on the difference, but it may perform the coring processing on the high-frequency area. The image processing apparatus 200 in the modified example is different from that of the second embodiment in that the coring processing is performed on the high-frequency area.

(Configuration Example of High-frequency Area Extraction Unit)

Figure 24:
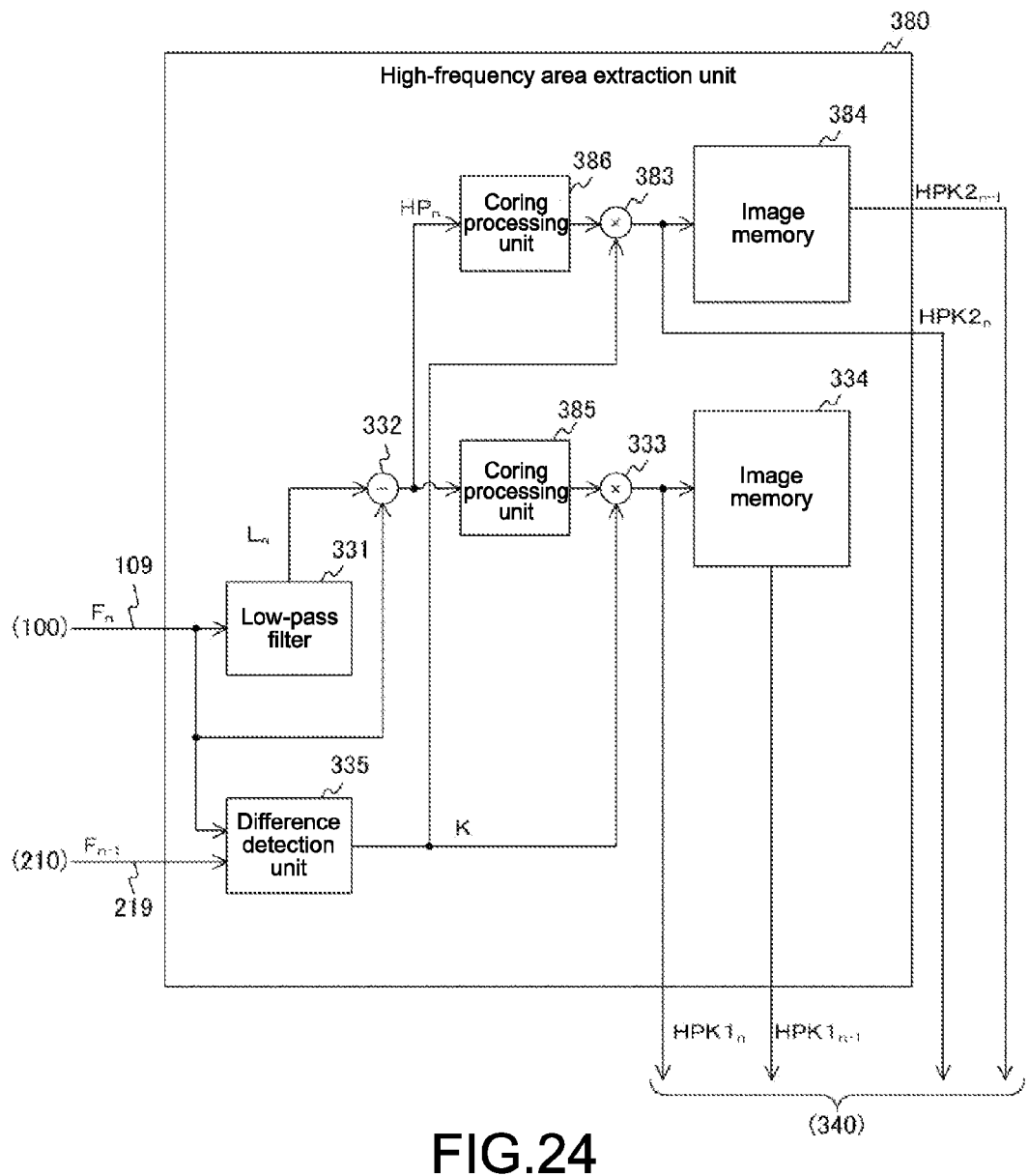
FIG. 24 is a block diagram showing a configuration example of a high-frequency area extraction unit in a modified example of the second embodiment.

FIG. 24 is a block diagram showing a configuration example of the high-frequency area extraction unit 380 in the modified example of the second embodiment. The high-frequency area extraction unit 380 in the modified example is different from that of the second embodiment in that coring processing units 385 and 386 are provided instead of the coring processing units 381 and 382.

The coring processing unit 385 executes coring processing to remove a pixel having a pixel value smaller than a pixel threshold $Th_{p1}$ in the high-frequency area $HP_n$. The coring processing unit 385 sequentially supplies the pixel value in the high-frequency area $HP_n$, which is obtained after the coring processing, to the multiplier 333. The multiplier 333 multiplies the difference value k and the pixel value supplied from the coring processing unit 385.

The coring processing unit 386 executes coring processing to remove a pixel having a pixel value smaller than a pixel threshold $Th_{p2}$ in the high-frequency area $HP_n$. The coring processing unit 386 sequentially supplies the pixel value in the high-frequency area $HP_n$, which is obtained after the coring processing, to the multiplier 383. The multiplier 383 multiplies the difference value k and the pixel value supplied from the coring processing unit 386.

Note that the high-frequency area extraction unit 380 executes both of the coring processing using the pixel threshold $Th_{p1}$ and the coring processing using the pixel threshold $Th_{p2}$, but it may execute any one of the processing. Further, the coring processing unit 385 is an example of a first pixel coring processing unit in the section "What is claimed is". Furthermore, the coring processing unit 386 is an example of a second pixel coring processing unit in the section "What is claimed is".

As described above, according to the modified example, the image processing apparatus 200 performs the coring processing on the high-frequency area $HP_n$ to remove a noise component in the high-frequency area $HP_n$.

Note that the embodiments described above are merely examples for embodying the present disclosure, and the matters in the embodiments have correlations with the matters specifying the present disclosure in the section "What is claimed is". Similarly, the matters specifying the present disclosure in the section "What is claimed is" have correlations with the matters in the embodiments of the present disclosure, which are denoted by the same names as those in the section "What is claimed is". Note that the present disclosure is not limited to the embodiments and can be embodied by variously modifying the embodiments without departing from the gist of the present disclosure.

Additionally, the processing procedures described in the above embodiments may be considered as a method including a series of those procedures, or may be considered as a program causing a computer to execute the series of those procedures or as a recording medium storing the program. Examples of the recording medium include a CD (Compact Disc), an MD (MiniDisc), a DVD (Digital Versatile Disk), a memory card, and a blu-ray disc (Blu-ray Disc (registered trademark)).

Note that the present disclosure can also take the following configurations.

(1) An image processing apparatus, including:

a normal interpolated image generation unit configured to generate an image that is interpolated between a plurality of original images reproduced along time series, the image being a normal interpolated image, based on each of the plurality of original images;

a high-frequency area extraction unit configured to extract a high-frequency area having a spatial frequency higher than a predetermined value in each of the plurality of original images;

a high-frequency area interpolated image generation unit configured to generate an image that is interpolated between the plurality of original images, the image being a high-frequency area interpolated image, based on a change in position of the high-frequency area along with an elapse of time on the time series and on each of the plurality of original images; and a combination unit configured to execute combining processing to combine the normal interpolated image and the high-frequency area interpolated image.

(2) The image processing apparatus according to (1), further including a vector detection unit configured to detect a vector indicating a direction and a distance in which a position of the high-frequency area changes within a certain period of time on the time series, in which the high-frequency area interpolated image generation unit is configured to generate the high-frequency area interpolated image based on the vector and each of the plurality of original images.

(3) The image processing apparatus according to (2), further including a combination ratio determination unit configured to determine a ratio at which the normal interpolated image and the high-frequency area interpolated image are combined, for each pixel in accordance with each pixel value of pixels in the high-frequency area, in which the combination unit is configured to execute the combining processing according to the ratio.

(4) The image processing apparatus according to (3), in which the high-frequency area extraction unit includes
a filter unit configured to extract the high-frequency area in each of the plurality of original images,
a difference detection unit configured to detect, for each pixel, a difference in pixel value between two adjacent original images of the plurality of original images, and
an increase unit configured to
increase each pixel value of the pixels in the high-frequency area in each of the two adjacent original images in accordance with the difference, and
supply the increased pixel value to the vector detection unit and the combination ratio determination unit.

(5) The image processing apparatus according to (4), in which the high-frequency area extraction unit includes a first difference coring processing unit configured to execute first difference coring processing to remove a difference smaller than a first difference threshold from the detected differences, and
the increase unit is configured to
increase each pixel value of the pixels in the high-frequency area in accordance with the difference on which the first difference coring processing is performed, and
supply the increased pixel value to the vector detection unit.

(6) The image processing apparatus according to (4) or (5), in which
the high-frequency area extraction unit includes a second difference coring processing unit configured to execute second difference coring processing to remove a difference smaller than a second difference threshold from the detected differences, and
the increase unit is configured to
increase each pixel value of the pixels in the high-frequency area in accordance with the difference on which the second difference coring processing is performed, and
supply the increased pixel value to the combination ratio determination unit.

(7) The image processing apparatus according to any one of (4) to (6), in which
the high-frequency area extraction unit includes a first pixel coring processing unit configured to execute first pixel coring processing to remove a pixel with a pixel value smaller than a first pixel value threshold in the extracted high-frequency area, and
the increase unit is configured to
increase, in accordance with the difference, each pixel value of the pixels in the high-frequency area on which the first pixel coring processing is performed, and
supply the increased pixel value to the vector detection unit.

(8) The image processing apparatus according to any one of (4) to (7), in which
the high-frequency area extraction unit includes a second pixel coring processing unit configured to execute second pixel coring processing to remove a pixel with a pixel value smaller than a second pixel value threshold in the extracted high-frequency area, and
the increase unit is configured to
increase, in accordance with the difference, each pixel value of the pixels in the high-frequency area on which the second pixel coring processing is performed, and
supply the increased pixel value to the combination ratio determination unit.

(9) The image processing apparatus according to any one of (1) to (8), in which
each of the plurality of original images includes a plurality of blocks each having a predetermined shape, and
the normal interpolated image generation unit is configured to generate the normal interpolated image based on a change in position of each of the plurality of blocks along with an elapse of time on the time series and on each of the plurality of original images.

(10) The image processing apparatus according to any one of (1) to (9), further including a selection unit configured to select the combined image by the combination unit and the plurality of original images in order of the time series and output the selected image.

(11) An image processing method, including:
generating, by a normal interpolated image generation unit, an image that is interpolated between a plurality of original images reproduced along time series, the image being a normal interpolated image, based on each of the plurality of original images;
extracting, by a high-frequency area extraction unit, a high-frequency area having a spatial frequency higher than a predetermined value in each of the plurality of original images;
generating, by a high-frequency area interpolated image generation unit, an image that is interpolated between the plurality of original images, the image being a high-frequency area interpolated image, based on a change in position of the high-frequency area along with an elapse of time on the time series and on each of the plurality of original images; and
executing, by a combination unit, combining processing to combine the normal interpolated image and the high-frequency area interpolated image.

(12) A program causing a computer to execute:
generating, by a normal interpolated image generation unit, an image that is interpolated between a plurality of original images reproduced along time series, the image being a normal interpolated image, based on each of the plurality of original images;
extracting, by a high-frequency area extraction unit, a high-frequency area having a spatial frequency higher than a predetermined value in each of the plurality of original images;
generating, by a high-frequency area interpolated image generation unit, an image that is interpolated between the plurality of original images, the image being a high-frequency area interpolated image, based on a change in position of the high-frequency area along with an elapse of time on the time series and on each of the plurality of original images; and
executing, by a combination unit, combining processing to combine the normal interpolated image and the high-frequency area interpolated image.

What is claimed is:
1. An image processing apparatus, comprising:
a normal interpolated image generation unit configured to generate an image that is interpolated between a plurality of original images reproduced along time series, the image being a normal interpolated image, based on each of the plurality of original images;
a high-frequency area extraction unit configured to extract a high-frequency area having a spatial frequency higher than a predetermined value in each of the plurality of original images;
a high-frequency area interpolated image generation unit configured to generate an image that is interpolated between the plurality of original images, the image being a high-frequency area interpolated image, based on a change in position of the high-frequency area along with an elapse of time on the time series and on each of the plurality of original images; and a combination unit configured to execute combining processing to combine the normal interpolated image and the high-frequency area interpolated image.

2. The image processing apparatus according to claim 1, further comprising a vector detection unit configured to detect a vector indicating a direction and a distance in which a position of the high-frequency area changes within a certain period of time on the time series, wherein the high-frequency area interpolated image generation unit is configured to generate the high-frequency area interpolated image based on the vector and each of the plurality of original images.

3. The image processing apparatus according to claim 2, further comprising a combination ratio determination unit configured to determine a ratio at which the normal interpolated image and the high-frequency area interpolated image are combined, for each pixel in accordance with each pixel value of pixels in the high-frequency area, wherein the combination unit is configured to execute the combining processing according to the ratio.

4. The image processing apparatus according to claim 3, wherein the high-frequency area extraction unit includes
a filter unit configured to extract the high-frequency area in each of the plurality of original images,
a difference detection unit configured to detect, for each pixel, a difference in pixel value between two adjacent original images of the plurality of original images, and
an increase unit configured to
increase each pixel value of the pixels in the high-frequency area in each of the two adjacent original images in accordance with the difference, and
supply the increased pixel value to the vector detection unit and the combination ratio determination unit.

5. The image processing apparatus according to claim 4, wherein the high-frequency area extraction unit includes a first difference coring processing unit configured to execute first difference coring processing to remove a difference smaller than a first difference threshold from the detected differences, and
the increase unit is configured to
increase each pixel value of the pixels in the high-frequency area in accordance with the difference on which the first difference coring processing is performed, and
supply the increased pixel value to the vector detection unit.

6. The image processing apparatus according to claim 4, wherein the high-frequency area extraction unit includes a second difference coring processing unit configured to execute second difference coring processing to remove a difference smaller than a second difference threshold from the detected differences, and
the increase unit is configured to
increase each pixel value of the pixels in the high-frequency area in accordance with the difference on which the second difference coring processing is performed, and
supply the increased pixel value to the combination ratio determination unit.

7. The image processing apparatus according to claim 4, wherein the high-frequency area extraction unit includes a first pixel coring processing unit configured to execute first pixel coring processing to remove a pixel with a pixel value smaller than a first pixel value threshold in the extracted high-frequency area, and
the increase unit is configured to
increase, in accordance with the difference, each pixel value of the pixels in the high-frequency area on which the first pixel coring processing is performed, and
supply the increased pixel value to the vector detection unit.

8. The image processing apparatus according to claim 4, wherein the high-frequency area extraction unit includes a second pixel coring processing unit configured to execute second pixel coring processing to remove a pixel with a pixel value smaller than a second pixel value threshold in the extracted high-frequency area, and
the increase unit is configured to
increase, in accordance with the difference, each pixel value of the pixels in the high-frequency area on which the second pixel coring processing is performed, and
supply the increased pixel value to the combination ratio determination unit.

9. The image processing apparatus according to claim 1, wherein each of the plurality of original images includes a plurality of blocks each having a predetermined shape, and
the normal interpolated image generation unit is configured to generate the normal interpolated image based on a change in position of each of the plurality of blocks along with an elapse of time on the time series and on each of the plurality of original images.

10. The image processing apparatus according to claim 1, further comprising a selection unit configured to select the combined image by the combination unit and the plurality of original images in order of the time series and output the selected image.

11. An image processing method, comprising:

generating, by a normal interpolated image generation unit, an image that is interpolated between a plurality of original images reproduced along time series, the image being a normal interpolated image, based on each of the plurality of original images;
extracting, by a high-frequency area extraction unit, a high-frequency area having a spatial frequency higher than a predetermined value in each of the plurality of original images;
generating, by a high-frequency area interpolated image generation unit, an image that is interpolated between the plurality of original images, the image being a high-frequency area interpolated image, based on a change in position of the high-frequency area along with an elapse of time on the time series and on each of the plurality of original images; and
executing, by a combination unit, combining processing to combine the normal interpolated image and the high-frequency area interpolated image.

12. A program causing a computer to execute:

generating, by a normal interpolated image generation unit, an image that is interpolated between a plurality of original images reproduced along time series, the image being a normal interpolated image, based on each of the plurality of original images;

extracting, by a high-frequency area extraction unit, a high-frequency area having a spatial frequency higher than a predetermined value in each of the plurality of original images;

generating, by a high-frequency area interpolated image generation unit, an image that is interpolated between the plurality of original images, the image being a high-frequency area interpolated image, based on a change in position of the high-frequency area along with an elapse of time on the time series and on each of the plurality of original images; and executing, by a combination unit, combining processing to combine the normal interpolated image and the high-frequency area interpolated image.

* * * * *